(12) United States Patent
Tange et al.

(10) Patent No.: US 7,053,503 B2
(45) Date of Patent: May 30, 2006

(54) CROSS CURRENT COMPENSATION CONTROL SYSTEM FOR A POWER SYSTEM

(75) Inventors: Seiji Tange, Tokyo (JP); Tadashi Matsumoto, Tokyo (JP); Tomoo Ashizawa, Tokyo (JP); Toshio Nomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 481 days.

(21) Appl. No.: 10/265,632

(22) Filed: Oct. 8, 2002

(65) Prior Publication Data

US 2003/0111907 A1 Jun. 19, 2003

(30) Foreign Application Priority Data

Dec. 14, 2001 (JP) ............................. 2001-381682

(51) Int. Cl.
*H02J 1/02* (2006.01)
(52) U.S. Cl. ............................. 307/51; 307/53; 307/55; 307/82; 307/83
(58) Field of Classification Search ................. 307/43, 307/51, 52, 53, 55, 82, 83; 322/17, 20
See application file for complete search history.

(56) References Cited

U.S. PATENT DOCUMENTS 3,829,669 A * 8/1974 Haley et al. .................. 703/18
3,936,727 A * 2/1976 Kelley et al. ................ 323/210
4,047,097 A * 9/1977 Gyugyi et al. ............... 323/211
4,320,306 A * 3/1982 Kohga et al. .................. 307/51
5,801,931 A * 9/1998 Kino et al. .................... 363/17
6,194,795 B1 2/2001 Müller
6,218,813 B1 * 4/2001 Davis ........................... 322/20
6,628,103 B1 * 9/2003 Sumiya et al. ................ 322/20

FOREIGN PATENT DOCUMENTS

DE 622 982 12/1935
DE 196 12 744 11/1997

OTHER PUBLICATIONS

Sekine, Yasuji: "Distribution Technology Overall Manual". (Nov. 30, 1991).
"Electrical Engineering Handbook", (Jan. 25, 1967).

* cited by examiner

*Primary Examiner*—Lynn Feild
*Assistant Examiner*—Michael Rutland-Wallis
(74) *Attorney, Agent, or Firm*—Leydig, Voit & Mayer, Ltd.

(57) ABSTRACT

Across current compensation control system includes a cross current detection compensator having an input terminal to which a cross connection line that cross-connects the secondary sides of auxiliary current transformers (CTs) are connected, and an output terminal to which cross current compensation lines that connect the secondary sides of CTs in series are connected, in which the cross current detection compensator supplies a compensation current to the cross current compensation line so as to cancel the current component corresponding to the cross current that appears at the secondary sides of the CTs when detecting the cross current that circulates within a bus bar, a distribution line, and a switch.

8 Claims, 20 Drawing Sheets

| DISTRIBUTION | PHASE-A TERMINAL VOLTAGE | PHASE-B TERMINAL VOLTAGE | PHASE-C TERMINAL VOLTAGE |
|---|---|---|---|
| 10 SIDE | Ea1 | Eb1 | Ec1 |
| 20 SIDE | Ea2 | Eb2 | Ec2 |
| OPEN POINT DIFFERENTIAL VOLTAGE OF SWITCH 30 | ΔEa | ΔEb | ΔEc |

PRIOR ART

CROSS CURRENT COMPENSATION CONTROL SYSTEM FOR A POWER SYSTEM

BACKGROUND OF THE INVENTION

1. Field of the Invention

The present invention relates to a cross current compensation control system for a power system which compensates a cross current during the parallel operation of a power transmission line, a power transformer, a device such as a distribution and equipment in the power system. For convenience of description, the operation of the distribution system will be mainly described.

2. Description of the Related Art

A conventional parallel operation of the distribution system will be described with reference to the accompanying drawings. FIG. 15 is a circuit diagram showing a conventional distribution parallel operation of the distribution system.

Referring to FIG. 15, reference numeral 1 denotes a power supply; 2 is a primary side circuit breaker of a power transformer (Tr); 3 is a primary side winding of the power transformer; 4 is a secondary side winding of the power transformer; 5 is a secondary side circuit breaker of the power transformer; and 6 is a bus bar.

Also, in the figure, reference numeral 10 denotes a distribution; 10-1 is a circuit breaker of the distribution 10; 11-1, 11-2, 11-3, 11-4 and 11-5 are sections in the distribution 10; and 10-2, 10-3, 10-4 and 10-5 are section switches or circuit breakers (hereinafter referred to as "switches") of the distribution 10.

Also, in the figure, reference numeral 20 denotes a distribution; 20-1 is a circuit breaker of the distribution 20; 21-1, 21-2, 21-3, 21-4 and 21-5 are sections in the distribution 20; and 20-2, 20-3, 20-4 and 20-5 are section switches or circuit breakers (hereinafter referred to as "switches") of the distribution 20.

In addition, in the figure, reference numeral 12 denotes a CT (current transformer) of the distribution 10; 13 is a device that monitors and protects the distribution 10 (hereinafter referred to as "protection relay" for convenience of description); 22 is a CT (current transformer) of the distribution 20; 23 a device that monitors and protects the distribution 20 (hereinafter referred to as "protection relay" for convenience of description); and 30 is a distribution connection switch or circuit breaker (hereinafter referred to as "switch"), between distribution 10 and 20.

In FIG. 15, the CT 12 of the distribution 10 and the CT 22 of the distribution 20 derive currents in the respective phases by using three CTs in a direct ground system of the distribution system, and an over-current relay (one of the protection relays) is located at their secondary sides, respectively, to protect against the over-load and short-circuiting fault of the distributions 10 and 20. In addition, a ground over-current relay (one of the protection relays) is disposed in a residual circuit at the secondary side of each of the CTs 12 and 22, respectively, to protect against the ground fault. Also, a CT and a protection relay are disposed in each of the section switches 10-2, 10-3, . . . , 20-2, 20-3, . . . and 30, as in the sending ends of the distributions 10 and 20, to monitor and protect the respective sections 11-2, 11-3, . . . and 21-2, 21-3, . . . .

Also, in FIG. 15, the CT 12 of the distribution 10 and the CT 22 of the distribution 20 derive currents in the respective phases by using two CTs in a high resistance ground system (including a GPT ground system) of the distribution system, and an over-current relay is located at their secondary sides, respectively, to protect against the over-load and short-circuiting fault of the distributions 10 and 20. Also, the CT 12 and the CT 22 derive a zero-phase current and a zero-phase voltage by using a ZCT and a GPT, and generally connect a ground direction relay to conduct a ground protection. Also, a CT and a protection relay which are similar to those at the sending ends of the distributions 10 and 20 are disposed in each of the section switches 10-2, 10-3, . . . , 20-2, 20-3, . . . and 30, to monitor and protect the respective sections 11-2 11-3, . . . and 21-2, 21-3, . . . .

Subsequently, the operation of the conventional distribution system will be described with reference to the accompanying drawings.

It has been known that a cross current 50 of a zero-phase flows when the switch 30 is closed by the operation of the distribution in FIG. 15. This is because the cross current 50 of the zero-phase occurs because impedances in the respective phases in a closed loop have slight differences even if supply voltages are identical.

The occurrence of the cross current will be described now. FIG. 16 shows a principle diagram of the generation of across current. In the figure, references Ea, Eb and Ec denote supply voltages; Za1, Zb1 and Zc1 are impedances at the distribution 10 side; and Za2, Zb2 and Zc2 are impedances at the distribution 20 side.

In this example, an actual distribution system is that when the switch 30 is closed, the above impedances are not completely identical with each other strictly, but very slightly in an unbalanced state in the respective phases. The unbalance is caused by, for example, a slight difference of the lengths of electric wires in the respective phases and a light difference of the contact resistances at nodes of the respective electric wires. Also, the unbalance is caused by a difference of a voltage drop in each of the phases due to the load unbalance of each of the phases, etc. There has been known a fact that an unbalanced voltage develops within a loop even if the supply voltage is of a synthetic three-phase voltage.

That is, in FIG. 16, the voltages in the respective phases when the switch 30 is opened are represented by a table of FIG. 17. In the table, the phase voltages at the distribution 10 side are Ea1, Eb1 and Ec1, and the phase voltage at the distribution 20 side are Ea2, Eb2 and Ec2, and differential voltages of the respective phases are represented by ΔEa, ΔEb and ΔEc. It is general that those differential voltages ΔEa, ΔEb and ΔEc cannot become the synthetic three-phase voltages due to a difference of the impedances of the respective phases and a difference of the load currents of the respective phases, as described above.

Subsequently, the magnitude of the cross current will be described. A positive-phase voltage, a negative-phase voltage and a zero-phase voltage called in a method of symmetric coordinates exist in an asymmetric three-phase voltage, and it is apparent that the magnitude of the cross current is determined by those voltages and a positive-phase impedance, a negative-phase impedance and a zero-phase impedance of the closed circuit. Although being dependent on the system, in this case, a fact that the magnitude of the cross current of the zero phase becomes about 1 to 10 A has been observed in the actual system.

The primary rating of the CT as generally used is 400 A or 600 A. In this example, the positive-phase and negative-phase currents are relatively small in comparison with the detection level of the over-load and the short-circuiting protection relay (about 5 A to 6 A of the CT secondary rating or more), and the zero-phase current becomes a value close to the detection level (about 0.1 A to 0.5 A) of the ground protection relay of the direct ground system. It is readily presumable that the current exceeds the detection level of the ground protection relay (about 0.2 to 0.5 A at the ZCT primary side).

The parallel operation of another conventional distribution system will be described with reference to the accompanying drawings. FIG. 18 is a circuit diagram showing a transformer in the same power supply in the conventional distribution system and the parallel operation of the distribution system. Also, FIG. 19 is a circuit diagram showing a transformer in the same power supply in the conventional distribution system and the parallel operation through the distribution system.

FIGS. 18 and 19 are diagrams showing the parallel operation of the power transformer and the parallel operation of the distribution. In the figures, reference 2-1 denotes a primary side circuit breaker; 3-1 is a primary side winding of the power transformer; 4-1 is a secondary side winding of the power transformer; 5-1 is a secondary side circuit breaker; 6-1 is a bus bar; and 7 is a bus bar connection circuit breaker. Other symbols are identical with those in FIG. 15.

The cross current will be described. In FIG. 18, when the switch 30 of the distributions 10 and 20 is closed, the cross current 50 occurs as described above. When the bus bar connection circuit breaker 7 is closed, the cross current 50-1 occurs. The occurrence causes of the cross current 50-1 are generally the impedance difference described above with reference to FIG. 15 as well as a voltage adjustment tap attached to the power transformer. The difference of the voltage adjustment tap position, and the impedance difference of the power transformer greatly operate as a source of generating the cross current. In this case, there has been well known a fact that all of the cross currents of the positive phase, the negative phase and the zero phase may lead to a problem.

Subsequently, the magnitude of the cross current will be described. In FIG. 18, the cross current 50 in the case where the bus bar connection circuit breaker 7 and the switch 30 are closed is identical with that in case of FIG. 15, and therefore its description will be omitted. A crosscurrent 50-1 will be described.

The short-circuiting % impedance (Z) of the power transformer is about 5 to 10%, and a voltage of one tap of the voltage adjustment tap is about 1 to 2%. In this example, assuming that % Z is 7.5% in each of the power transformer in both of two power transformers, a one-tap voltage is 1.25% and the shift is two taps, the subsequent values are obtained through rough calculation.

Differential voltage $\Delta V = 1.25\% * 2 = 2.5\%$

Closed loop $Z = 7.5\% * 2 = 15\%$

Cross current $I = \Delta V/Z = 16.7\%$

That is, in the power transformer where the secondary rating is 10 MVA, 6.6 kV and 875 A, the magnitude of the cross current in this case becomes 875 A*0.167=146 A and thus becomes a very large value.

Subsequently, a case in which the bus bar connection circuit breaker 7 is opened and the switch 30 is closed in FIG. 19 will be described. In this case, the cross current becomes in a state where the cross current described in FIG. 15 and the cross current in the above parallel power transformer are superimposed on each other. The cross current of the zero-phase of the high-voltage distribution becomes much-larger as compared with that in case of FIG. 15 and may reach several tens of A to about 100 A depending on the circumstances.

The parallel operation of still another conventional distribution system will be described with reference to the accompanying drawings. FIG. 20 is a circuit diagram showing a transformer in a different power supply system of the conventional distribution system and the parallel operation of the distribution system. Also, FIG. 21 is a circuit diagram for explanation of a cross current that occurs during the parallel operation in the different power supply in the conventional distribution system.

FIG. 20 shows a case of the parallel operation of a two power supply system. In FIG. 20, reference 1-1 denotes another power supply. The same references denote identical parts in FIG. 18.

The cross current will be described. Referring to FIG. 20, the cross current in the case where the bus bar connection circuit breaker 7 is opened and the switch 30 is closed will be described. The cross current 50 that occurs in FIG. 20 is added with the magnitude of the voltages of two power supplies and the voltage phase in addition to the case of FIG. 18. In general, the parallel of the two power supplies are permitted only when the power supply 1 and the power supply 1-1 are identical with each other in its upstream system, and the system operation is made. It is general that the parallel in the completely different systems is not implemented.

Subsequently, the magnitude of the cross current will be described. FIG. 21 is a diagram showing a power supply and an impedance corresponding to FIG. 20. As described above, the voltages, the impedances and the voltage phases in two power supplies determine the magnitude of the cross current. The voltages Ea-1, Eb-1, Ec-1 and Ea-2, Eb-2, Ec-2 shown in the figure are applied from the same bus bar of the upstream system or a higher upstream system, and in any case, a difference in the magnitude and phase exists between those voltages. The magnitude of the cross current is determined in accordance with the voltage, the phase difference and the magnitude of the impedance within the closed loop.

The parallel operation of the conventional distribution system shown in FIG. 15 suffers from such a problem in that the existing ground protection relay is adversely affected by the cross current, in particular, the zero-phase current. That is, a purpose of the protection relay may be lost such that the ground fault current to be operated is offset into malfunction or malfunction is made at a time where operation should not be conducted, in accordance with the direction of the cross current of the zero-phase. Also, an ohm loss may occur due to the positive-phase and negative-phase cross currents or an excessive power (an active component, a reactive component) is measured in the measured value.

Also, in the parallel operation of the conventional distribution system shown in FIG. 18, there is a case in which the cross currents may exceed the rated current of the power transformer because the cross currents of the positive phase and the negative phase between the power transformers become very large values in addition to the case shown in FIG. 15, which influences the various protection relays and also influences the measured value. In particular, in the case of conducting the parallel operation only at the distribution side, it can be readily presumed that the function of section monitoring terminals located in the distribution and the sections is remarkably impeded.

In addition, the parallel operation of the conventional distribution system shown in FIG. 20 suffers from the same problem as that in FIG. 18 and has the possibility that a severe problem occurs.

The parallel operation technique of the conventional power system suffers from the above problems and resulting in that:

1) the existing protection relay cannot achieve a desired object, in particular the ground relay suffers from a problem;
2) a useless value is contained in the existing measured value;
3) a useless loss occurs in the power system;
4) an overload is induced; and
5) a power device is damaged.

SUMMARY OF THE INVENTION

The present invention has been made in order to solve the above-mentioned problem with the related art. Therefore an object of the present invention is to provide a cross current compensation control system for a power system which is capable of compensating the cross current.

In order to achieve the above object, according to the present invention, there is provided a cross current compensation control system for a power system, including first and second current transformers disposed at the respective sending ends of first and second power systems connected to the same bus bar, a plurality of third current transformers disposed in each of sections of the first and second power systems, and a cross current detection compensator having an input terminal and an output terminal in which a cross connection line that cross-connects a secondary side of the first and second current transformers is connected to the input terminal and a cross current compensation line that connects the secondary sides of the plurality of the third current transformers in series is connected to the output terminal.

The cross current detection compensator supplies a compensation current to the cross current compensation line so as to cancel a current component corresponding to the cross current that appears at the secondary sides of the plurality of third current transformers when the cross current detection compensator detects a cross current that circulates within the bus bar, the first and second power systems and a switch that connects the first and second power systems.

According to this structure, the zero-phase input amounts at the respective terminals can be compensated, the respective terminals can improve the reliability of the protection function, in particular, the reliability with respect to the ground protection. Also, it is possible to compensate the cross current of the sending end to the protection relay as in case of the terminal side, and the reliability of the sending end, in particular, the ground protection function can be improved.

Also, according to the present invention, there is provided a cross current compensation control system for a power system including first and second current transformers disposed at the respective secondary sides of first and second power transformers connected to the same power supply, a cross current detection compensator connected to a cross connection line that cross-connects the secondary sides of the first and second current transformers, a first voltage adjusting device connected to a first bus bar connected to the secondary sides of the cross current detection compensator and the first power transformer, and a second voltage adjusting device connected to a second bus bar connected to the secondary sides of the cross current detection compensator and the second power transformer.

The cross current detection compensator outputs a compensation voltage when detecting a cross current that circulates within the first and second power transformers, the first and second bus bars and a switch that connects the first and second bus bars, in which the first voltage adjusting device controls the voltage adjustment tap at the secondary side of the first power transformer on the basis of the voltage of the first bus bar and the compensation voltage, and in which the second voltage adjusting device controls the voltage adjustment tap at the secondary side of the second power transformer on the basis of the voltage of the second bus bar and the compensation voltage.

According to this structure, the cross current of the power transformer that is driven in parallel can be minimized and the power loss due to the useless cross current can be suppressed.

Further, according to the present invention, there is provided a cross current compensation control system for a power system including a first current transformer disposed at the secondary side of a first power transformer connected to a first power supply, a second current transformer disposed at the secondary side of a second power transformer connected to a second power supply, a cross current detection compensator connected to a cross connection line that cross-connects the secondary sides of the first and second current transformers, a first voltage adjusting device connected to a first bus bar connected to the secondary sides of the cross current detection compensator and the first power transformer, and a second voltage adjusting device connected to a second bus bar connected to the secondary sides of the cross current detection compensator and the second power transformer.

The cross current detection compensator outputs a compensation voltage when detecting a cross current that circulates within the first and second power transformers, the first and second bus bars and a switch that connects the first and second bus bars, in which the first voltage adjusting device controls the voltage adjustment tap at the secondary side of the first power transformer on the basis of the voltage of the first bus bar and the compensation voltage, and in which the second voltage adjusting device controls the voltage adjustment tap at the secondary side of the second power transformer on the basis of the voltage of the second bus bar and the compensation voltage.

According to this structure, the cross current in the transformers and the distribution of the different system parallel operation can be minimized.

BRIEF DESCRIPTION OF THE DRAWINGS

These and other objects and advantages of the present invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
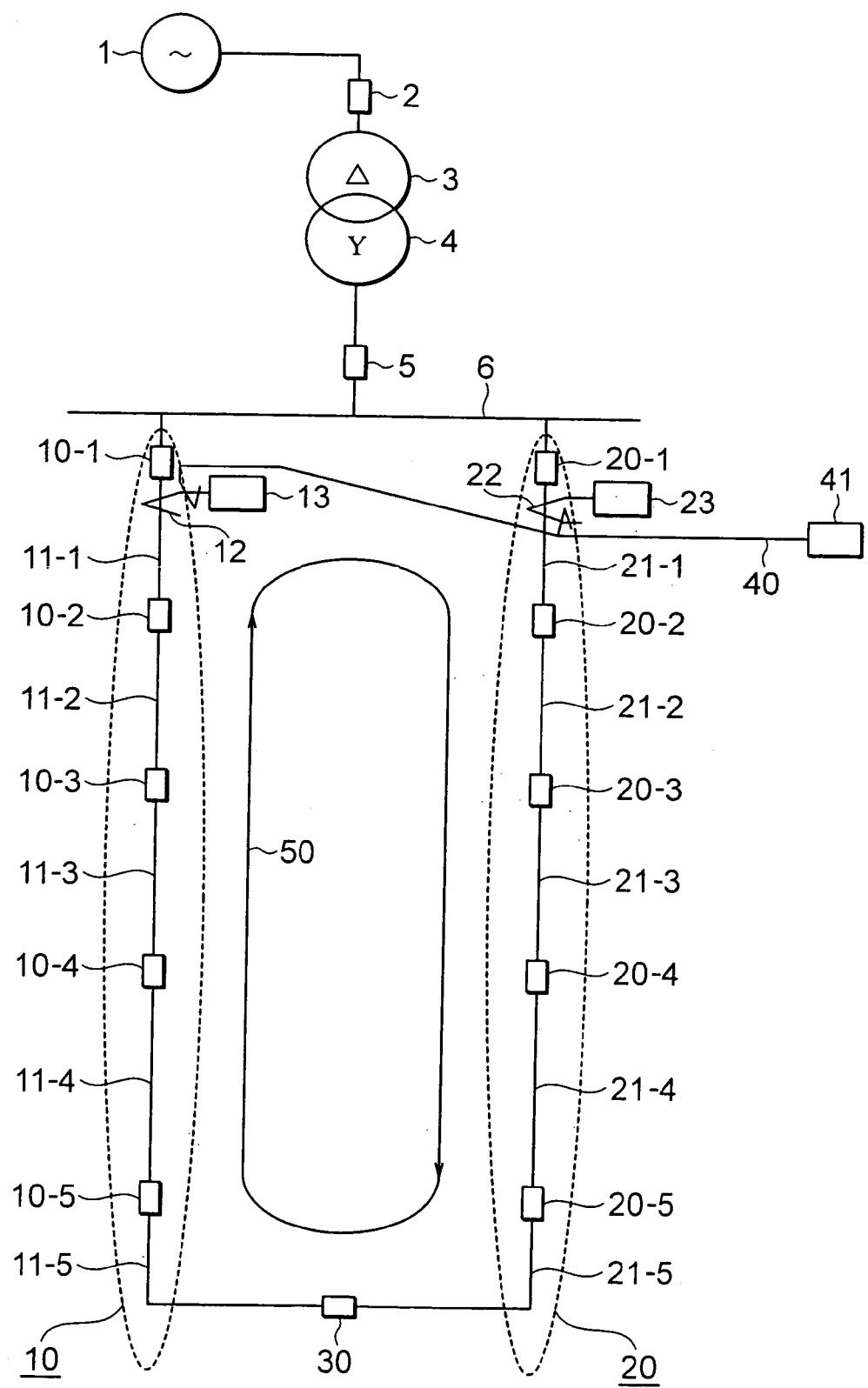
FIG. 1 is a circuit diagram showing a cross current compensation control system for a distribution system in accordance with a first embodiment of the present invention.

A cross current compensation control system for a power system in accordance with a first embodiment of the present invention will be described with reference to the accompanying drawings. FIG. 1 is a circuit diagram showing the cross current compensation control system for a distribution system in accordance with the first embodiment of the present invention. Also, the same references in each figure denote the identical or corresponding functions.

The first embodiment of the present invention is designed in such a manner that a zero-phase circuit at the CT secondary side of a distribution sending end is cross-connected so as to derive only the cross current of a zero phase and the zero-phase current is detected to compensate the cross current of the zero phase.

Figure 15:
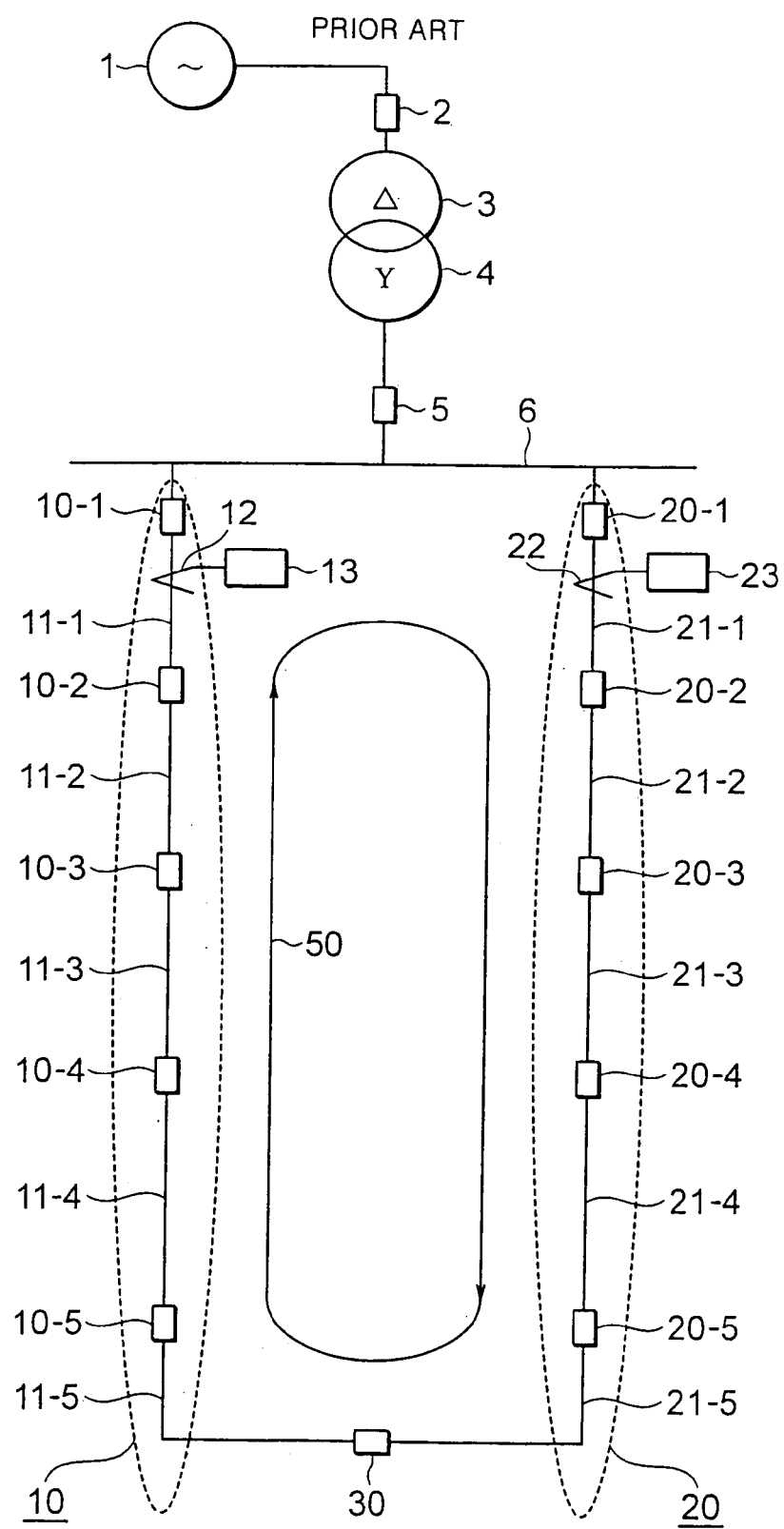
FIG. 15 is a circuit diagram showing a conventional distribution system.
Figures 16, 17:
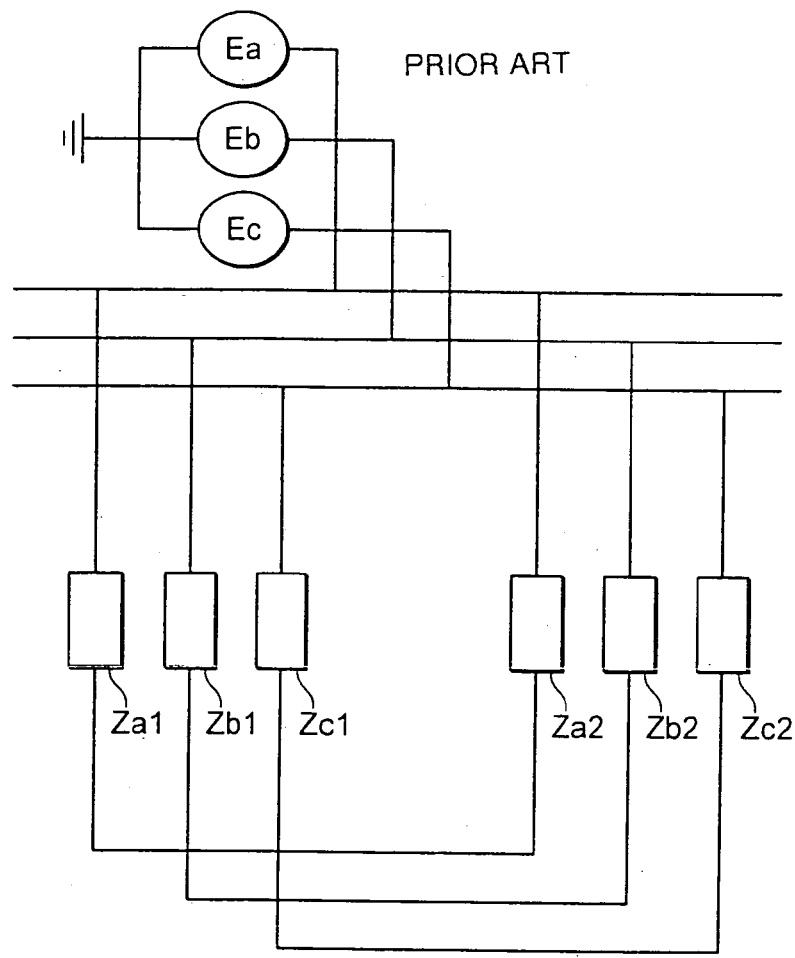
FIG. 16 is a circuit diagram showing a circuit for explanation of the occurrence of a cross current in the conventional distribution system.
FIG. 17 is a diagram showing a table for explanation of the occurrence of a cross current in the conventional distribution system.

Referring to FIG. 1, reference numeral 40 denotes a cross connection line, and 41 is a cross current detection compensator such as a transformer. The same references as those in FIG. 15 have identical functions and operations as those of the devices and equipment of FIG. 15.

Figure 2:
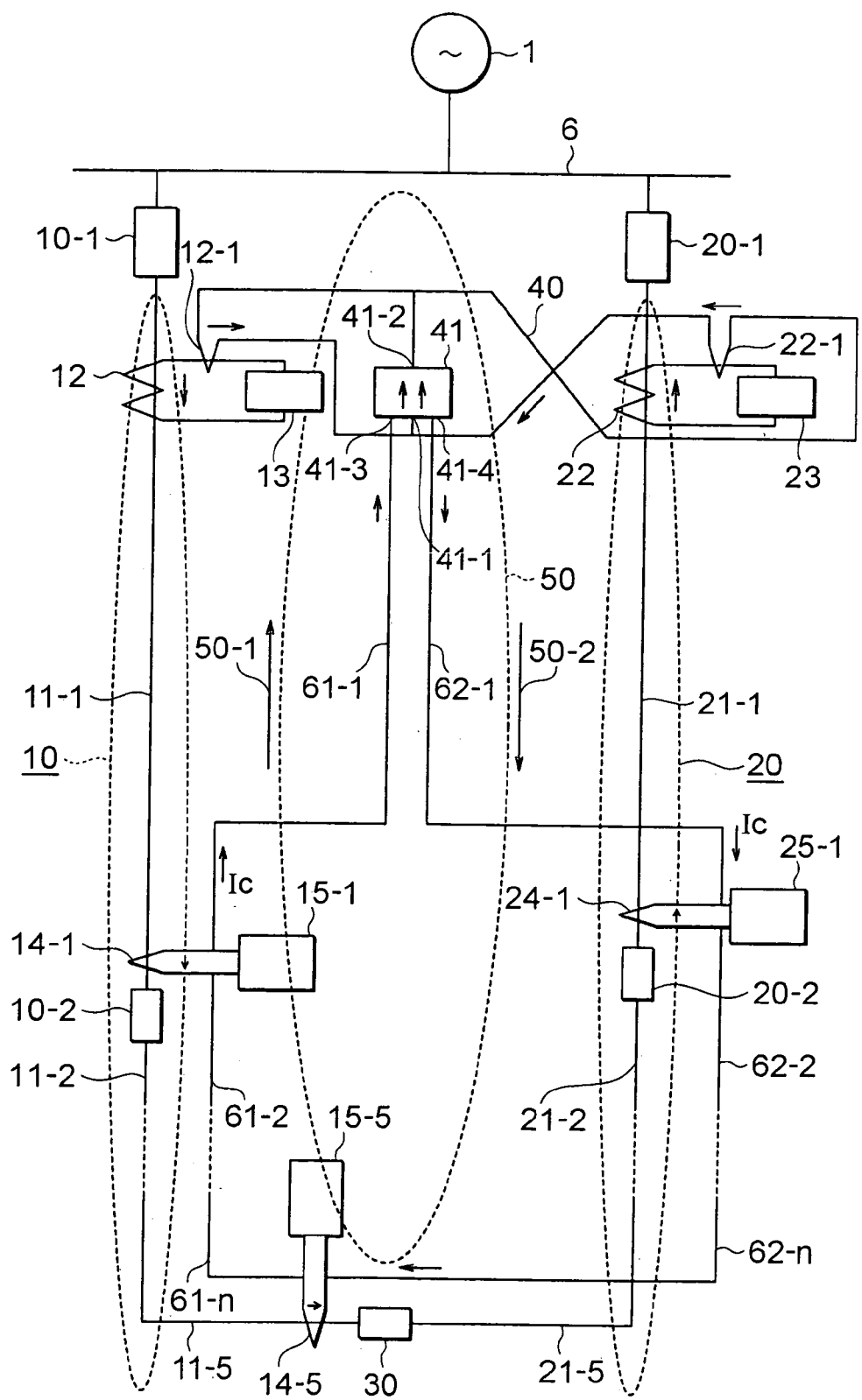
FIG. 2 is a detailed circuit diagram showing the cross current compensation control system for a distribution system in accordance with the first embodiment of the present invention.

Also, FIG. 2 is a detailed circuit diagram showing the cross current compensation control system for a distribution system in accordance with the first embodiment of the present invention.

Referring to FIG. 2, reference 12-1 denotes an auxiliary CT (current transformer) inserted into a zero-phase circuit at the secondary side of a CT 12, and 22-1 is an auxiliary CT (current transformer) inserted into a zero-phase circuit at the secondary side of a CT 22. References 41-1 and 41-2 denote input terminals (primary side terminals) of a cross current detection compensator 41, and 41-3 and 41-4 are output terminals (secondary side terminals) of the cross current detection compensator 41. When the input terminal 41-1 is +, the polarity of + appears in the output terminal 41-3.

Also, in the drawing, reference 14-1, . . . 14-5, and 24-1, . . . denote CTs (current transformers) disposed in switches 10-2, . . . 30 and 20-2, . . . , and references 15-1, . . . 15-5 and 25-1, . . . denote section monitoring terminals that measure or protect the section currents. In addition, references 50-1 and 50-2 denote zero-phase cross currents of a main circuit. References 61-1, 61-2, . . . 61-n, 62-1, 62-2, . . . 62-n are cross current compensation lines of the zero phase to the respective section monitoring terminals 15-1, . . . .

Subsequently, the operation of the cross current compensation control system for a distribution system in accordance with the first embodiment will be described with reference to the accompanying drawings.

Referring to FIG. 2, when the switch 30 is closed to generate a cross current 50, the cross currents 50-1 and 50-2 of the zero-phase flow. Although a flowing direction represents the clockwise direction, the counterclockwise direction may be applied depending on the impedance and the condition of the system, but a case of the clockwise will be described for convenience of description.

On the other hand, a load current IL1−the zero-phase cross current flows in the distribution line 10 side, a load current IL2+the zero-phase cross current flows in the distribution 20 side, and a current proportional thereto flows in the respective section monitoring terminals. That is, the zero-phase cross current is added to one current and the zero-phase cross current is subtracted from the other current.

According to the first embodiment of the present invention, the respective section monitoring terminals are compensated by using a compensation current Ic outputted from the cross current detection compensator 41. For example, the current component corresponding to the above zero-phase cross current that appears on the secondary side of the CT 14-1 connected to the section monitoring terminal 15-1 is canceled by the compensation current Ic. The CT ratio (transformation ratio) of the CTs 12, 22 and the auxiliary CTs 12-1, 22-1, CT14-1, . . . 14-5, and 24-1, . . . as well as the compensation ratio (transformation ratio) of the cross current detection compensator 41 are set in advance so that the current component corresponding to the zero-phase cross current is canceled by the compensation current Ic, that is, the current components become at the same current level. Although a difference between the load current at the distribution 10 side and the load current at the distribution 20 side exists strictly, there arises no problem because no load current appears in the zero-phase circuit.

Figure 3:
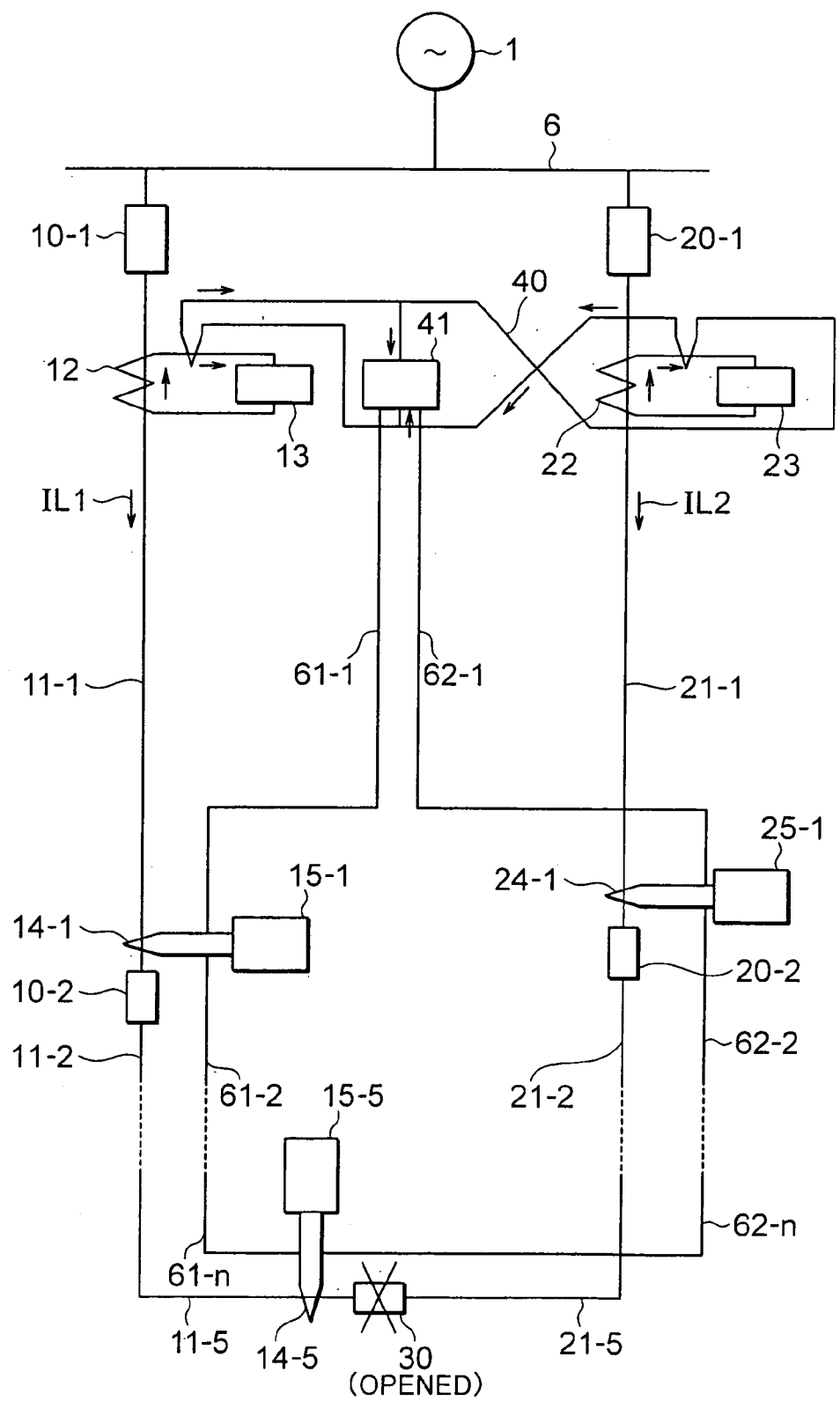
FIG. 3 is a detailed circuit diagram showing the cross current compensation control system for a distribution system in accordance with the first embodiment of the present invention.

A case in which the switch 30 is opened will be described with reference to FIG. 3. Although the load currents IL1 and IL2 of the respective distributions 10 and 20 flow, since their load current components do not flow in the cross current detection compensator 41 connected to the cross connection line 40 of the zero phase, there arises no problem.

In other words, the cross current compensation control system for a distribution system in accordance with the first embodiment of the present invention includes CTs 12 and 22 and auxiliary CTs 12-1, 22-1 which are disposed at the respective sending ends of the distributions 10 and 20 connected to the same bus bar 6, a plurality of CTs 14-1, . . . 14-5 and 24-1, . . . disposed in each of the sections of the distributions 10 and 20, and input terminals 41-1, 41-2 and output terminals 41-3, 41-4, and provides a cross current detection compensator 41 in which a cross connection line 40 that cross-connects the secondary side of the auxiliary CTs 12-1 and 22-1 is connected to the input terminal, and cross current compensation lines 61-1, 61-2, . . . 61-$n$, 62-1, 62-2, . . . 62-$n$ that connect the secondary sides of the plurality of CTs 14-1, . . . 14-5 and 24-1, . . . in series are connected to the output terminal. The cross current detection compensator 41 supplies a compensation current Ic to the cross current compensation lines 61 and 62 so as to cancel a current component corresponding to the cross current 50 that appears on the secondary sides of the plurality of CTs 14 and 24 when detecting the cross current 50 that circulates within the bus bar 6, the distributions 10, 20 and the distribution connection switch 30 that connects the distribution 10 and the distribution 20.

As described above, according to the first embodiment of the present invention, because the zero-phase input amounts of the respective section monitoring terminals 15 and 25 are compensated, the respective section monitoring terminals improve the reliability of the protection function, in particular, the reliability with respect to the ground protection. For this reason, the respective section monitoring terminals can correctly grasp the state and execute the sure protection.

(Second Embodiment)

Figure 4:
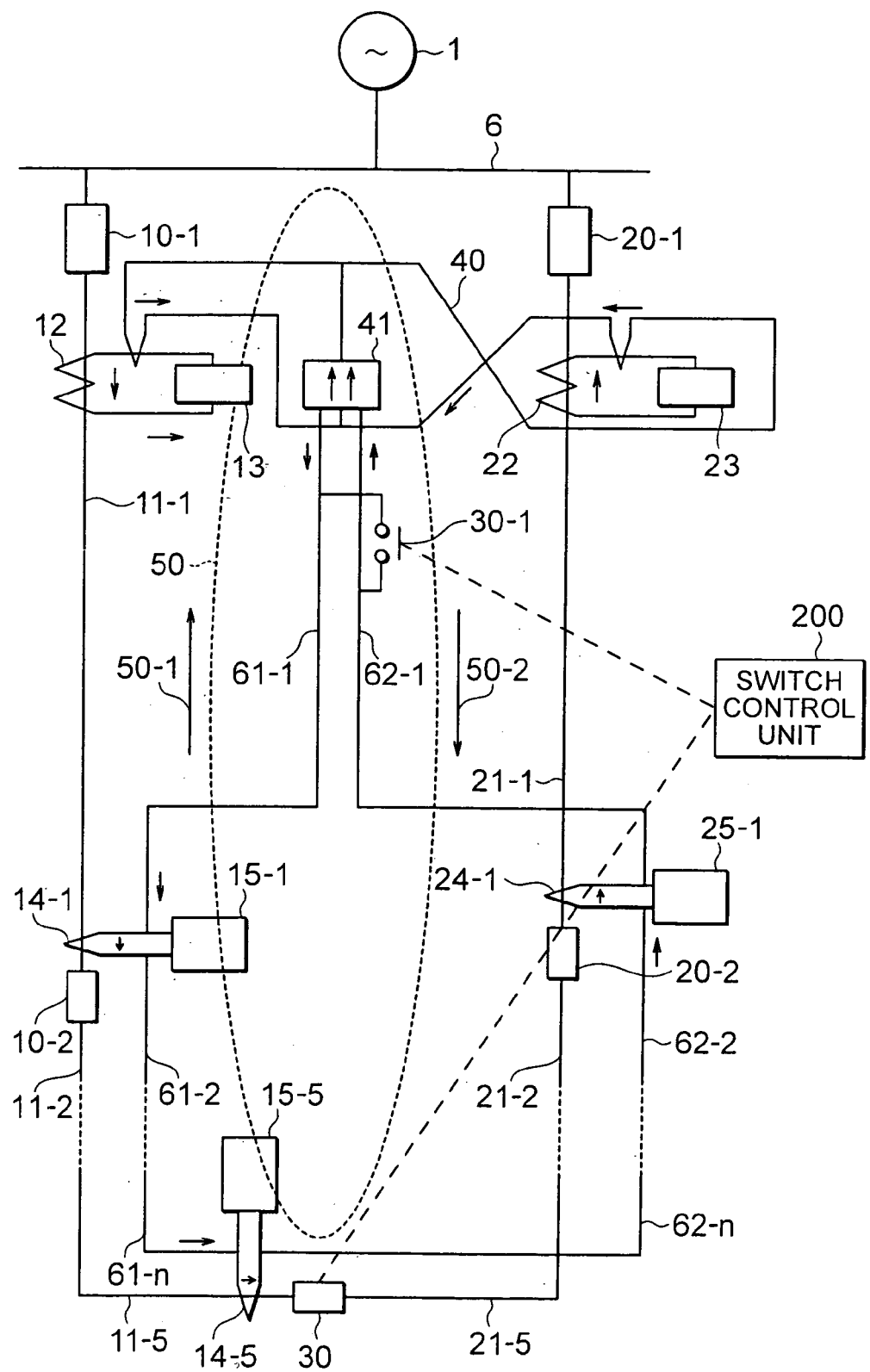
FIG. 4 is a detailed circuit diagram showing a cross current compensation control system for a distribution system in accordance with a second embodiment of the present invention.

A cross current compensation control system for a power system in accordance with a second embodiment of the present invention will be described with reference to the accompanying drawings. FIG. 4 is a detailed circuit diagram showing the cross current compensation control system for a distribution system in accordance with the second embodiment of the present invention.

Referring to FIG. 4, reference 30-1 denotes a switch contact that is controlled in association with the control of the switch 30, and 200 is a switch control unit that controls the switch and the like and includes a calculator. Also, the same references as those in FIGS. 1 and 2 except for the references 30-1 and 200 have the identical functions.

In other words, when the switch control unit 200 opens the switch 30, the switch contact 30-1 is closed. On the other hand, when the switch control unit 200 closes the switch 30, the switch contact 30-1 is opened. This control is effective in the case where the distributions 10 and 20 operate independently.

In other words, the cross current compensation control system for a distribution system according to the second embodiment further includes, in addition to the elements of the above first embodiment, the switch contact 30-1 that is connected between the output terminals 41-3 and 41-4 of the cross current detection compensator 41 and closed when the switch 30 that connects the distributions 10 and 20 to each other is opened.

According to this embodiment, in the case where the distributions 10 and 20 change from a loop system to a radial system, the output side of the cross current detection compensator 41 that detects and compensates the cross current 50 caused by a difference in the load amount or the like between the respective distributions 10 and 20 are short-circuited, whereby the cross current detection compensator 41 is not an obstacle in operation without impeding the natural functions of the section monitoring terminals 15 and 25.

(Third Embodiment)

Figure 5:
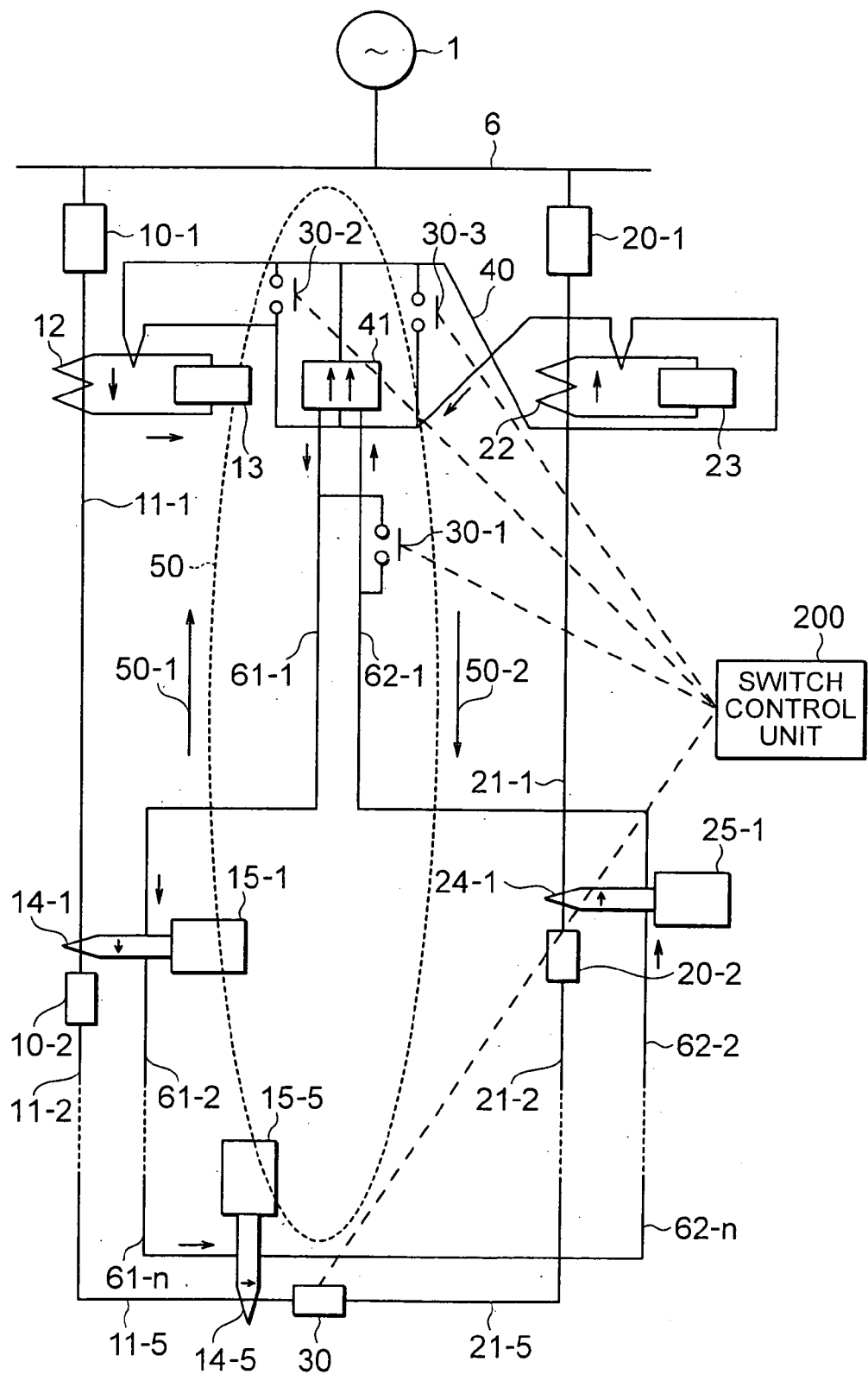
FIG. 5 is a detailed circuit diagram showing a cross current compensation control system for a distribution system in accordance with a third embodiment of the present invention.

Across current compensation control system for a power system in accordance with a third embodiment of the present invention will be described with reference to the accompanying drawings. FIG. 5 is a detailed circuit diagram showing the cross current compensation control system for a distribution system in accordance with the third embodiment of the present invention.

Referring to FIG. 5, references 30-2 and 30-3 denote switch contacts that are controlled in association with the control of the switch 30. Also, the same references as those in FIG. 4 except for the references 30-2 and 30-3 have the identical functions.

In other words, in the case where the switch 30 is opened by the switch control unit 200, the switch contacts 30-1, 30-2 and 30-3 are closed. On the other hand, when the switch 30 is closed by the switch control unit 200, those switch contacts 30-1, 30-2 and 30-3 are opened under control. Thus, the same function as that of the above second embodiment or better is provided.

In other words, the cross current compensation control system for a distribution system according to the third embodiment further includes, in addition to the elements of the above first embodiment, the switch contact 30-1 that is connected between the output terminals 41-3 and 41-4 of the cross current detection compensator 41 and closed when the switch 30 that connects the distributions 10 and 20 to each other is opened, and the switch contacts 30-2 and 30-3 that are connected between the input terminals 41-1 and 41-2 of the cross current detection compensator 41 and closed when the switch 30 that connects the distributions 10 and 20 to each other is opened.

According to this embodiment, in the case where the distributions 10 and 20 change from a loop system to a radial system, the output side and the input side of the cross current detection compensator 41 that detects and compensates the cross current 50 caused by a difference in the load amount or the like between the respective distributions 10 and 20 are short-circuited, whereby the cross current detection compensator 41 is not an obstacle in operation without impeding the natural functions of the section monitoring terminals 15 and 25.

(Fourth Embodiment)

Figure 6:
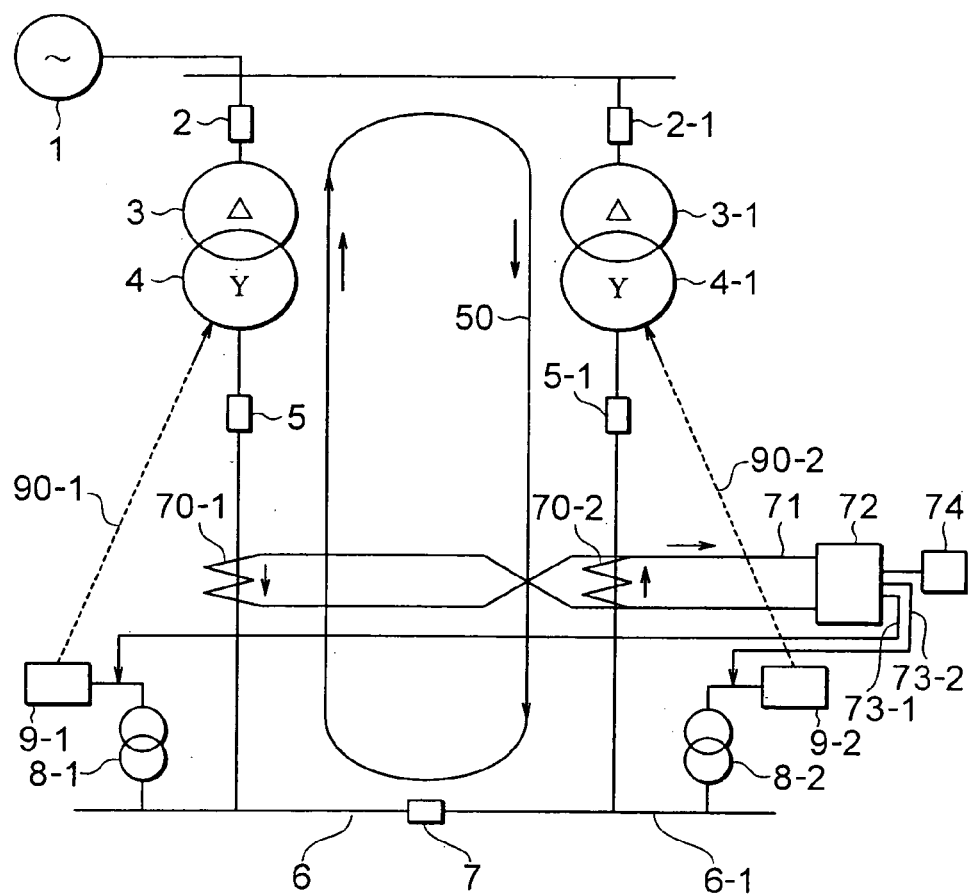
FIG. 6 is a circuit diagram showing a cross current compensation control system for a distribution system in accordance with a fourth embodiment of the present invention.

A cross current compensation control system for a power system in accordance with a fourth embodiment of the present invention will be described with reference to the accompanying drawings. FIG. 6 is a detailed circuit diagram showing the cross current compensation control system for a distribution system in accordance with the fourth embodiment of the present invention. FIG. 6 shows the cross current compensation control system in the case where the power transformers operate in parallel.

Referring to FIG. 6, reference 8-1 denotes a PT (transformer) connected to a bus bar 6, 8-2 is a PT (transformer) connected to the bus bar 6-1, 9-1 is a voltage adjustment relay for secondary voltage adjustment (voltage adjusting device) of the power transformers (3, 4), and 9-2 is a voltage adjustment relay for secondary voltage adjustment (voltage adjusting device) of the power transformers (3-1, 4-1).

Figure 18:
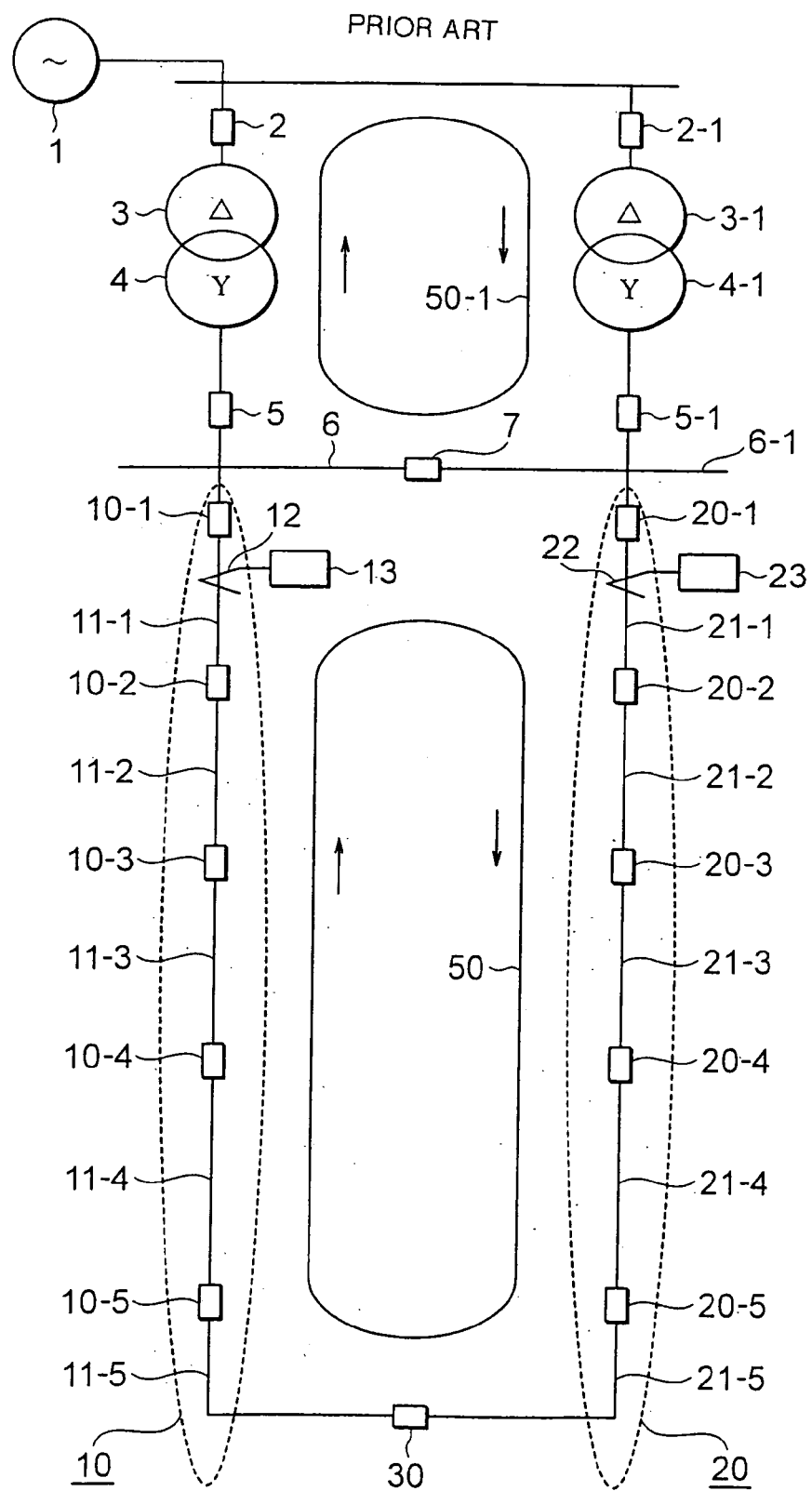
FIG. 18 is a circuit diagram showing another conventional distribution system.
Figure 19:
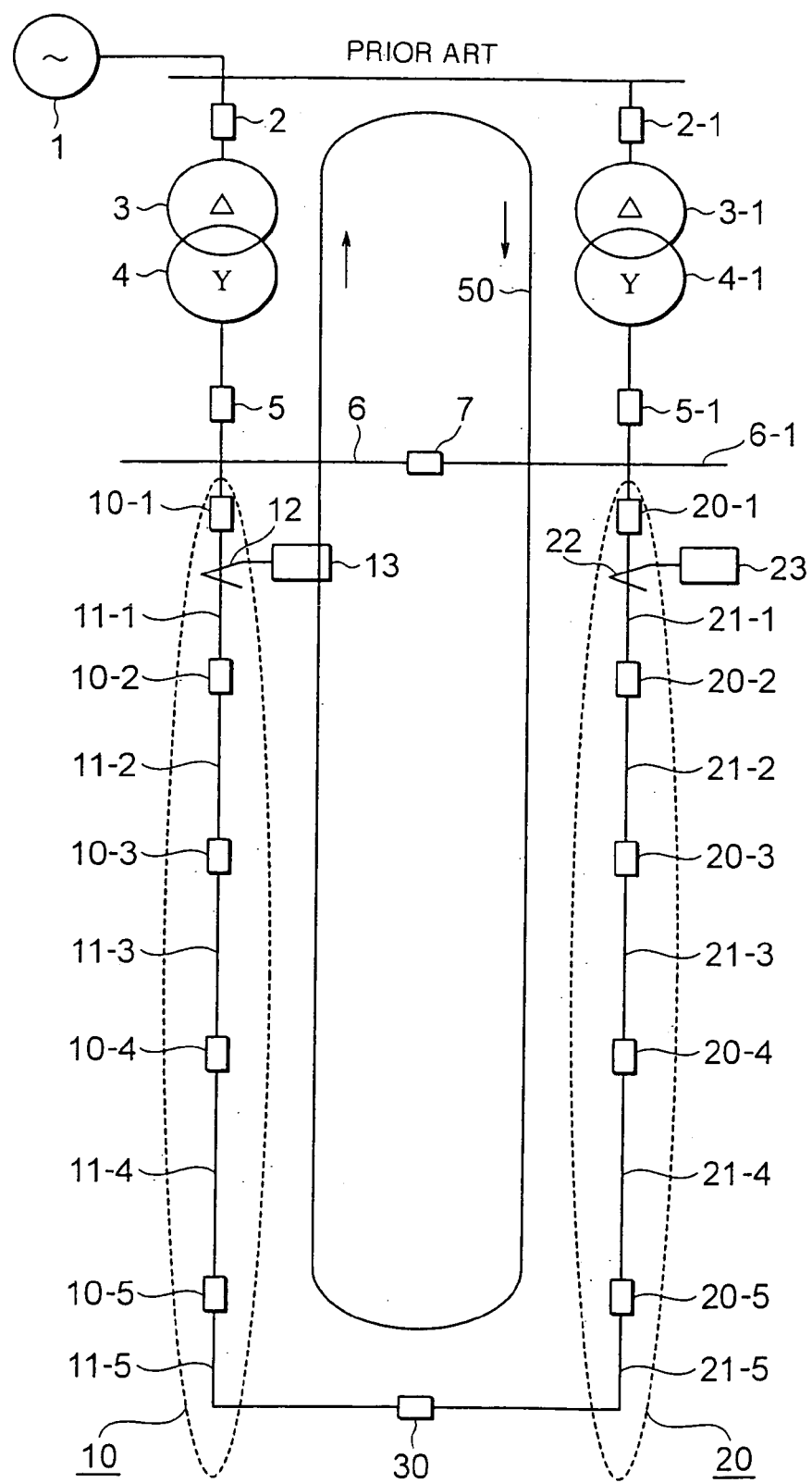
FIG. 19 is a circuit diagram showing still another conventional distribution system.
Figure 20:
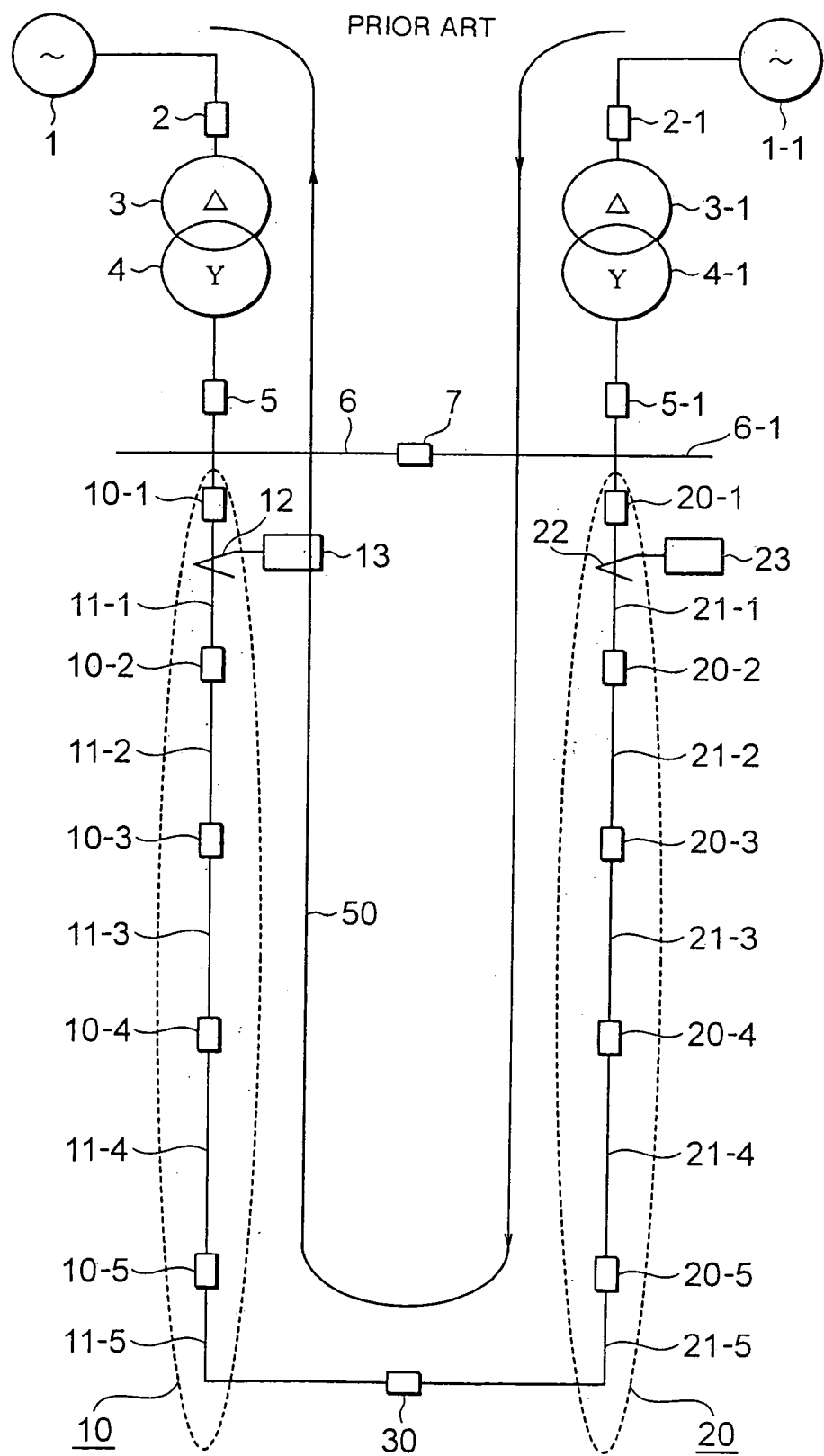
FIG. 20 is a circuit diagram showing yet still another conventional distribution system.
Figure 21:
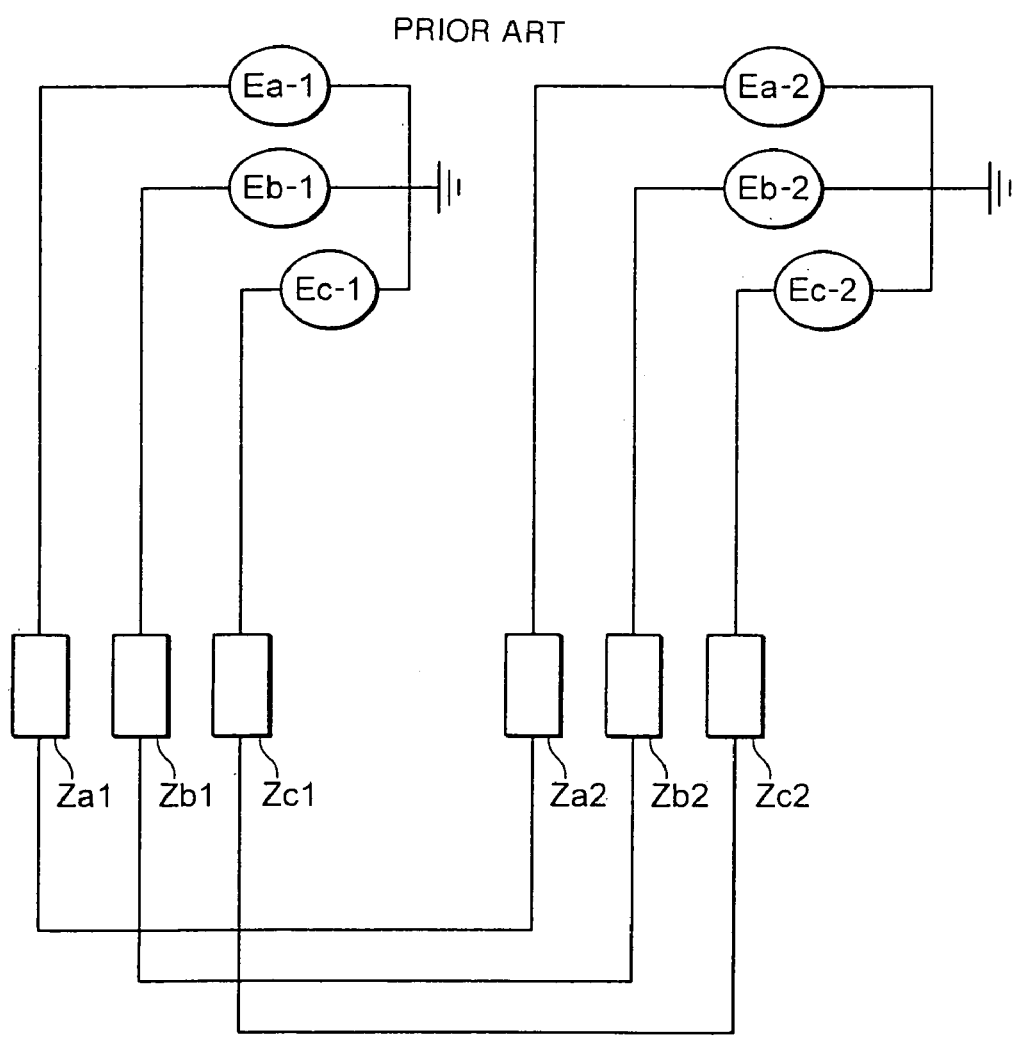
FIG. 21 is a circuit diagram showing yet still another conventional distribution system.

Also, in the figure, reference 70-1 denotes a secondary current derivation CT (current transformer) of the power transformers (3, 4), 70-2 is a secondary current derivation CT (current transformer) of the power transformers (3-1, 4-1), 71 is a cross connection line that cross-connects the secondary sides of those CTs 70-1 and 70-2, 72 is a cross current detection compensator, 73-1 is a cross current compensation output line, 73-2 is another cross current compensation output line, 74 is a cross current measuring device for monitoring the cross current, and 90-1 and 90-2 are control lines. The same references as those in FIG. 18 except for the above references have the identical functions.

Subsequently, the operation of the cross current compensation control system for a distribution system in accordance with the fourth embodiment will be described with reference to the accompanying drawings.

There has been well known a fact that, in FIG. 6, when the bus bar connection circuit breaker 7 is closed, and a voltage difference and an impedance difference exist between the power transformers (3, 4) and the power transformers (3-1, 4-1), the positive-phase and negative-phase cross currents 50 flow as shown in the figure. The fourth embodiment of the present invention is that the occurrence of the cross current is suppressed and monitored by using the cross current 50.

According to the fourth embodiment, the input voltages to the voltage adjustment relays 9-1 and 9-2 are controlled (compensated) by the cross current 50, whereby the voltage adjustment relays 9-1 and 9-2 raise the secondary voltage of the power transformers at a lower voltage side and drop the secondary voltage of the power transformers at a higher voltage side through the control lines 90-1 and 90-2 under the control.

As to the zero-phase current in this case, in the case where both of the primary side winding and the secondary side winding of the power transformer are of the direct ground system, the circulation of the zero-phase current exists within the closed loop, but it is general that such a connection is not conducted in the power transformer for a distribution system in order to prevent the occurrence of a third higher harmonic wave.

FIGS. 7A to 7F are diagrams showing vectors of voltages and currents at the respective points of the cross current compensation control system in accordance with the fourth embodiment.

Figure 7A:
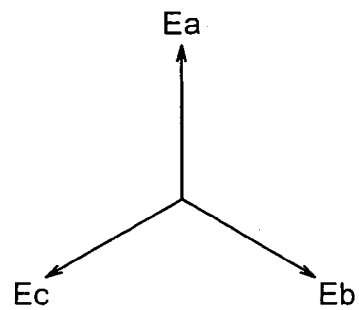
FIGS. 7A to 7F are diagrams showing the operation of the cross current compensation control system for a distribution system in accordance with the fourth embodiment of the present invention.
Figure 7D:
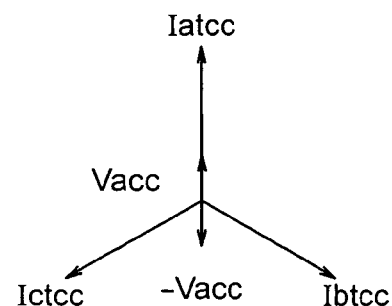
Figure 7B:
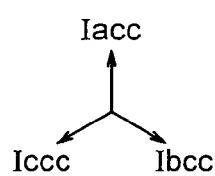
Figure 7E:
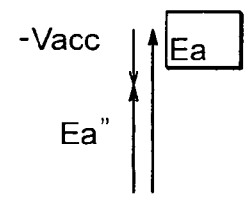
Figure 7C:
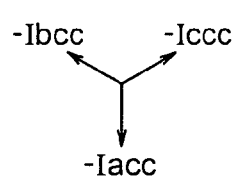
Figure 7F:
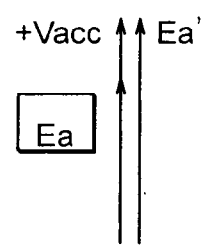

As the input current to the cross current detection compensator 72 in this case, the three-phase current is employed as it is. Referring to FIGS. 7A to 7F, FIG. 7A denotes voltages Ea, Eb and Ec of the bus bars 6 and 6-1. FIG. 7B denotes a cross current (circulating current) 50 at the power transformers (3-1, 4-1) side, FIG. 7C is a cross current (circulating current) 50 at the power transformers (3, 4) side, and a phase difference of even 180 degrees is defined between those cross currents 50. FIG. 7D is cross current synthetic values of the respective phases, that is, a phase A is indicated as Iatcc, a phase B is indicated as Ibtcc and a phase C is indicated as Ictcc. Reference Vacc designates a compensation voltage produced by using the cross current synthetic value Iatcc of the phase A.

Also, in FIGS. 7A to 7F, FIG. 7E denotes an input voltage received by the voltage adjustment relay 9-1 at the power transformers (3, 4) side. Reference Ea is a voltage of the bus bar 6 obtained through the PT 8-1, −Vacc is a compensation voltage supplied from the cross current detection compensator 72, and Ea" is an input voltage received by the voltage adjustment relay 9-1. In this case, because the voltage at the power transformers (3, 4) side is low, when the cross current 50 circulates clockwise as shown in the figure, the voltage adjustment relay 9-1 conducts the control for raising the voltage through the control line 90-1 on the basis of the input voltage Ea"=Ea−Vacc by adjusting the secondary side tap of the power transformers (3, 4).

Further, in FIGS. 7A to 7F, FIG. 7F denotes an input voltage received by the voltage adjustment relay 9-2 at the power transformers (3-1, 4-1) side. Reference Ea is a voltage of the bus bar 6-1 obtained through the PT 8-2, +Vacc is a compensation voltage supplied from the cross current detection compensator 72, and Ea' is an input voltage received by the voltage adjustment relay 9-2. In this case, because the voltage at the power transformers (3-1, 4-1) side is high, the voltage adjustment relay 9-2 conducts the control for dropping the voltage through the control line 90-2 on the basis of the input voltage Ea'=Ea+Vacc by adjusting the secondary side tap of the power transformers (3-1, 4-1).

Figure 8:
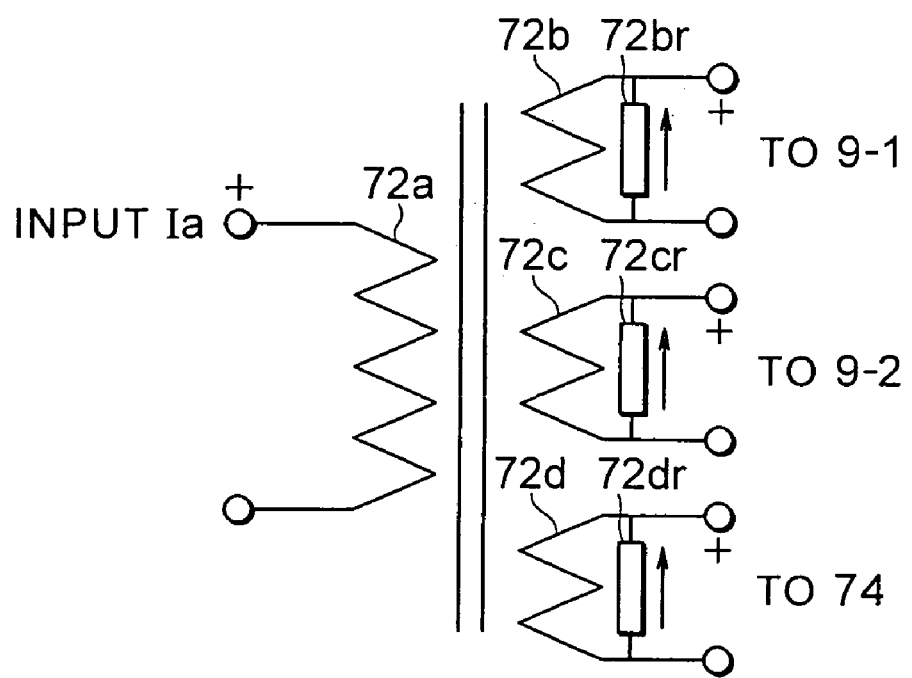
FIG. 8 is a circuit diagram showing a cross current detection compensator of the cross current compensation control system for a distribution system in accordance with the fourth embodiment of the present invention.

A specific deriving method of the compensation voltage will be described. FIG. 8 shows an example of a downsized transformer as the cross current detection compensator 72.

In FIG. 8, when the detection current Ia of the cross current 50 flows into a primary winding 72a, voltages develop between both ends of resistors 72br, 72cr and 72dr connected to secondary, third and fourth windings 72b, 72c and 72d, respectively.

A voltage developed between both ends of the resistor 72br of the secondary winding 72b is applied to the voltage adjustment relay 9-1 through the cross current compensation output line 73-1 as the compensation voltage. Also, a voltage developed between both ends of the resistor 72cr of the third winding 72c is applied to the voltage adjustment relay 9-2 through the cross current compensation output line 73-2 as the compensation voltage. Further, a voltage developed between both ends of the resistor 72dr of the fourth winding 72d is applied to the cross current measuring device 74 for the cross current amount monitor.

The resistors are inserted into the secondary, third and fourth windings, respectively, but even if one resistor is inserted into any one of the secondary, third and fourth windings, a predetermined purpose of the present invention can be achieved, that is, it is possible to derive the compensation voltage proportional to the primary input current, and it is possible to realize the initial purpose by using the compensation voltage for the respectively intended purposes shown in the figure.

In other words, the cross current compensation control system for a distribution system in accordance with the fourth embodiment includes: the current transformers 70-1 and 70-2 disposed at the respective secondary sides of the power transformers (3, 4) and (3-1, 4-1) connected to the same power supply 1; the cross current detection compensator 72 connected to the cross connection line 71 that cross-connects the secondary sides of the current transformers 70-1 and 70-2; the voltage adjustment relay 9-1 connected to the bus bar 6 connected to the secondary sides of the cross current detection compensator 72 and the power transformers (3, 4) through the PT8-1; and the voltage adjustment relay 9-2 connected to the bus bar 6-1 connected to the secondary sides of the cross current detection compensator 72 and the power transformers (3-1, 4-1) through the PT8-2, in which: the cross current detection compensator 72 outputs the compensation voltage when detecting the cross current 50 that circulates within the power transformers (3, 4) and (3-1, 4-1), the bus bars 6, 6-1, and the switch 7 that connects the bus bars 6 and 6-1; the voltage adjustment relay 9-1 controls the voltage adjustment tap at the secondary side of the power transformers (3, 4) on the basis of the voltage of the bus bar 6 and the compensation voltage; and the voltage adjustment relay 9-2 controls the voltage adjustment tap at the secondary side of the power transformers (3-1, 4-1) on the basis of the voltage of the bus bar 6-1 and the compensation voltage.

According to the fourth embodiment, it is possible to minimize the cross current of the power transformers (3, 4) and (3-1, 4-1) which are driven in parallel, and it is possible to suppress the power loss caused by the useless cross current 50. Also, it is possible to suppress the cross current from the power transformers that are driven in parallel in the distribution system, and it is possible to suppress the useless power loss as in the above embodiment, thereby being capable of accurately exhibiting the functions (measurement, protection, etc.) of the respective section monitoring terminals disposed on the distributions.

(Fifth Embodiment)

Figure 9:
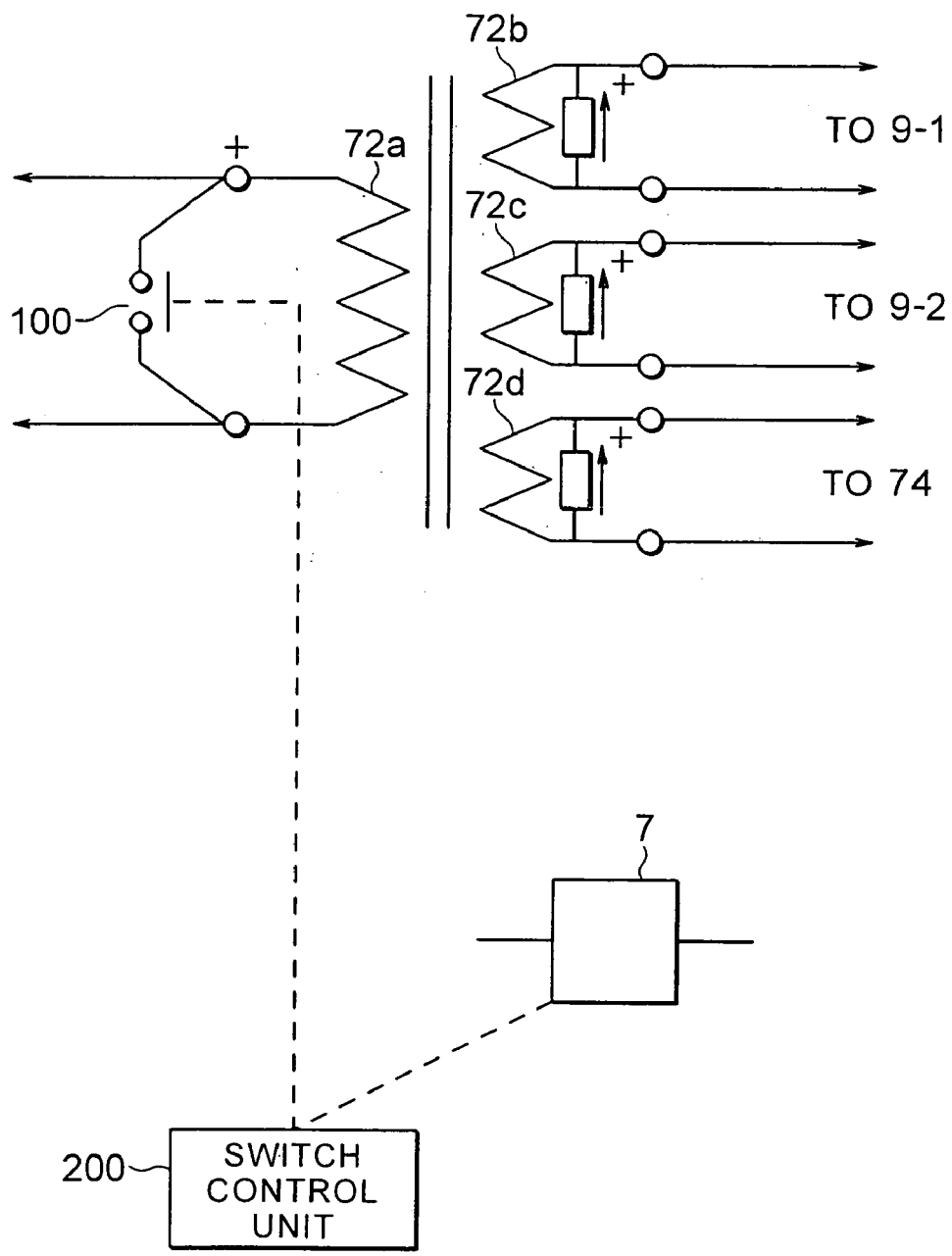
FIG. 9 is a circuit diagram showing a cross current detection compensator of a cross current compensation control system for a distribution system in accordance with a fifth embodiment of the present invention.

A cross current compensation control system for a power system in accordance with a fifth embodiment of the present invention will be described with reference to the accompanying drawings. FIG. 9 is a detailed circuit diagram showing the cross current compensation control system for a distribution system in accordance with the fifth embodiment of the present invention.

Referring to FIG. 9, reference numeral 100 denotes a switch contact that is controlled so as to be closed when the bus bar connection circuit breaker 7 is opened. Reference numeral 200 denotes a switch control unit that controls switch unit and the like.

Referring to FIG. 9, the bus bar connection circuit breaker 7 is opened by the switch control unit 200, the switch contact 100 is controlled so as to be closed. That is, in FIG. 6, in the case where the respective power transformers (3, 4) and (3-1, 4-1) are driven independently, because no cross current exists, it is necessary to cancel the function of the cross current detection compensator 72.

In other words, in the cross current compensation control system for a power system in accordance with the fifth embodiment, the cross current detection compensator 72 includes the switch contact 100 that is connected between the input terminals of the cross current detection compensator and closed when the bus bar connection circuit breaker 7 that connects the bus bars 6 and 6-1 is opened.

According to the fifth embodiment, because the functions are canceled at the input side of the cross current detection compensator 72 when the parallel operation of the power transformers (3, 4) and (3-1, 4-1) is canceled, the operation can be conducted without any trouble of the system operation.

(Sixth Embodiment)

Figure 10:
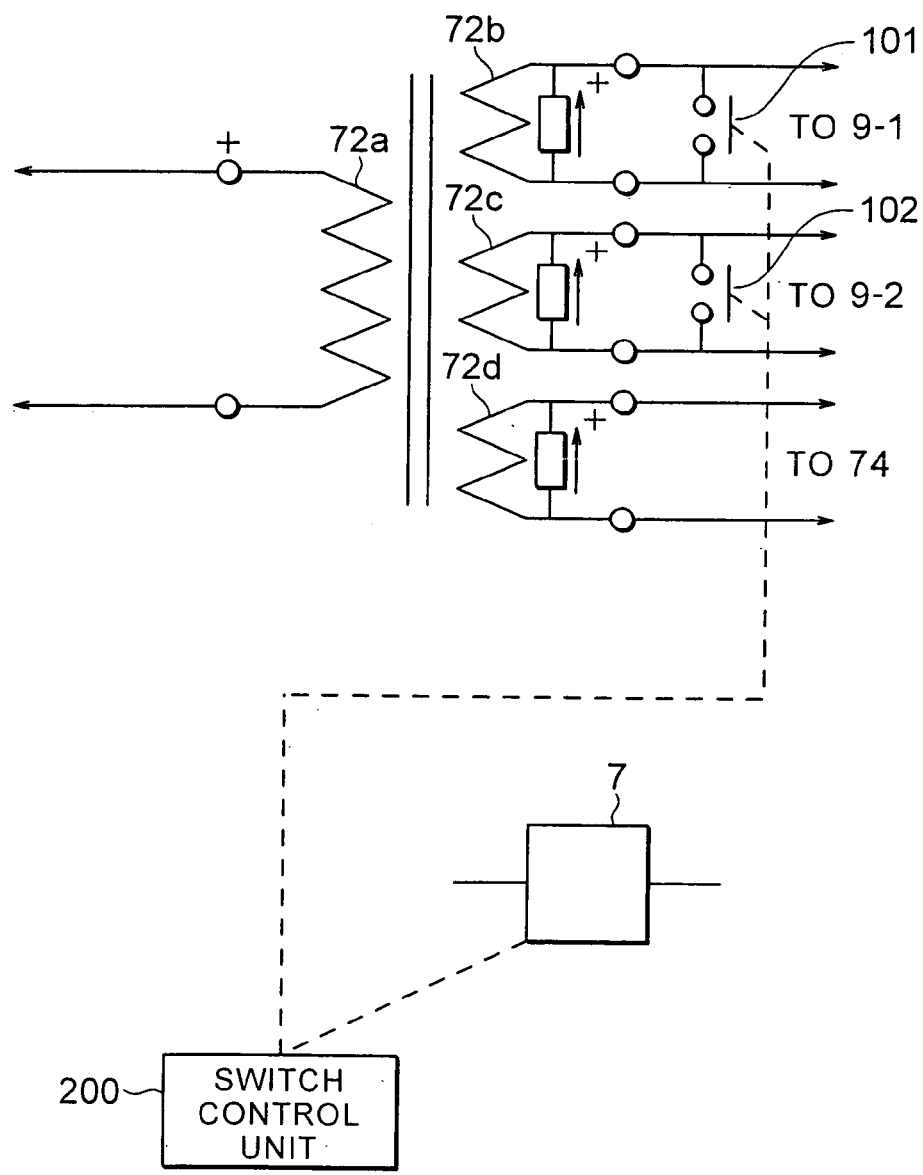
FIG. 10 is a circuit diagram showing a cross current detection compensator of a cross current compensation control system for a distribution system in accordance with a sixth embodiment of the present invention.

A cross current compensation control system for a power system in accordance with a sixth embodiment of the present invention will be described with reference to the accompanying drawings. FIG. 10 is a circuit diagram showing the cross current compensation control system for a distribution system in accordance with the sixth embodiment of the present invention.

Referring to FIG. 10, reference numeral 101 and 102 denote switch contacts that are controlled so as to be closed when the bus bar connection circuit breaker 7 is opened by the switch control unit 200. That is, in FIG. 6, in the case where the respective power transformers (3, 4) and (3-1, 4-1) are driven independently, because no cross current exists, it is necessary to cancel the function of the cross current detection compensator 72. In the sixth embodiment, because the cross current monitor output is obtained, it is possible to monitor the load balancing between the power transformers (3, 4) and (3-1, 4-1), and another function increases.

In other words, in the cross current compensation control system for a power system in accordance with the sixth embodiment, the cross current detection compensator 72 includes the switch contacts 101 and 102 that are connected between the output terminals of the cross current detection compensator and closed when the bus bar connection circuit breaker 7 that connects the bus bars 6 and 6-1 is opened.

According to the sixth embodiment, because the function of the cross current detection compensator 72 is canceled at the secondary (output) side thereof, there can be provided a system high in reliability in which the CT circuit is not opened since the CT circuit is not directly controlled. Also, according to this system, it is possible to monitor the balance state of the power transformers (3, 4) and (3-1, 4-1).

(Seventh Embodiment)

Figure 11:
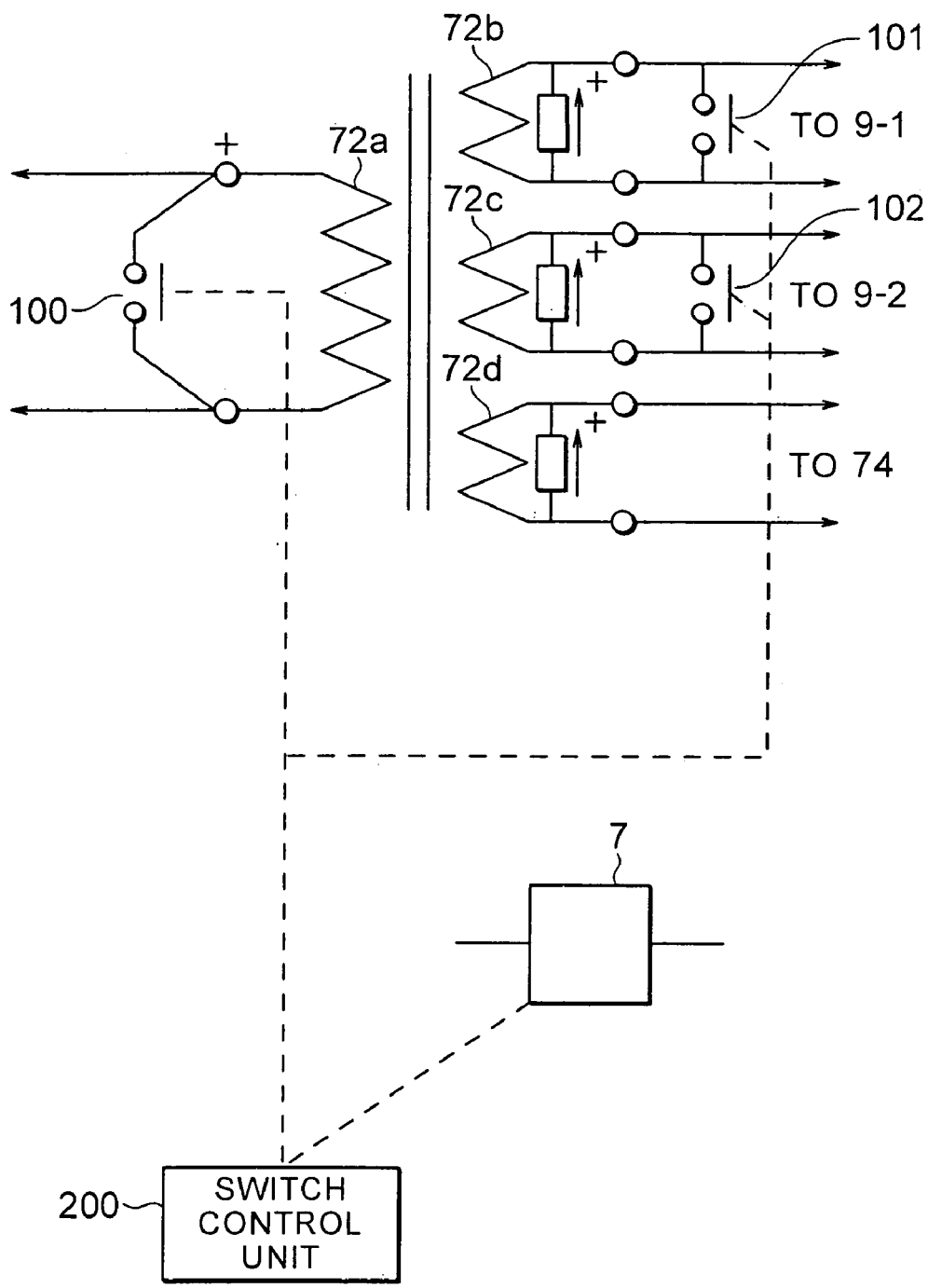
FIG. 11 is a circuit diagram showing a cross current detection compensator of a cross current compensation control system for a distribution system in accordance with a seventh embodiment of the present invention.

A cross current compensation control system for a power system in accordance with a seventh embodiment of the present invention will be described with reference to the accompanying drawings. FIG. 11 is a detailed circuit diagram showing the cross current compensation control system for a distribution system in accordance with the seventh embodiment of the present invention.

Referring to FIG. 11, the respective switch contacts 100 to 102 have the same functions as those in the above-mentioned fifth and sixth embodiments. That is, the seventh embodiment is directed to the invention that combines the fifth and sixth embodiments together. The switch contact 100 as well as the switch contacts 101 and 102 are closed by the switch control unit 200, thereby being capable of more accurately canceling the cross current compensation function.

In this example, it is possible to monitor the balancing of the respective power transformers (3, 4) and (3-1, 4-1) in the above fifth embodiment. However, in the seventh embodiment, the monitor of the balancing can be realized by locating the current/voltage converter having the same function, independently, without any problem.

In this example, the respective power transformers (3, 4) and (3-1, 4-1) are driven independently, and a case in which the switch 30 is closed will be described.

Figure 12:
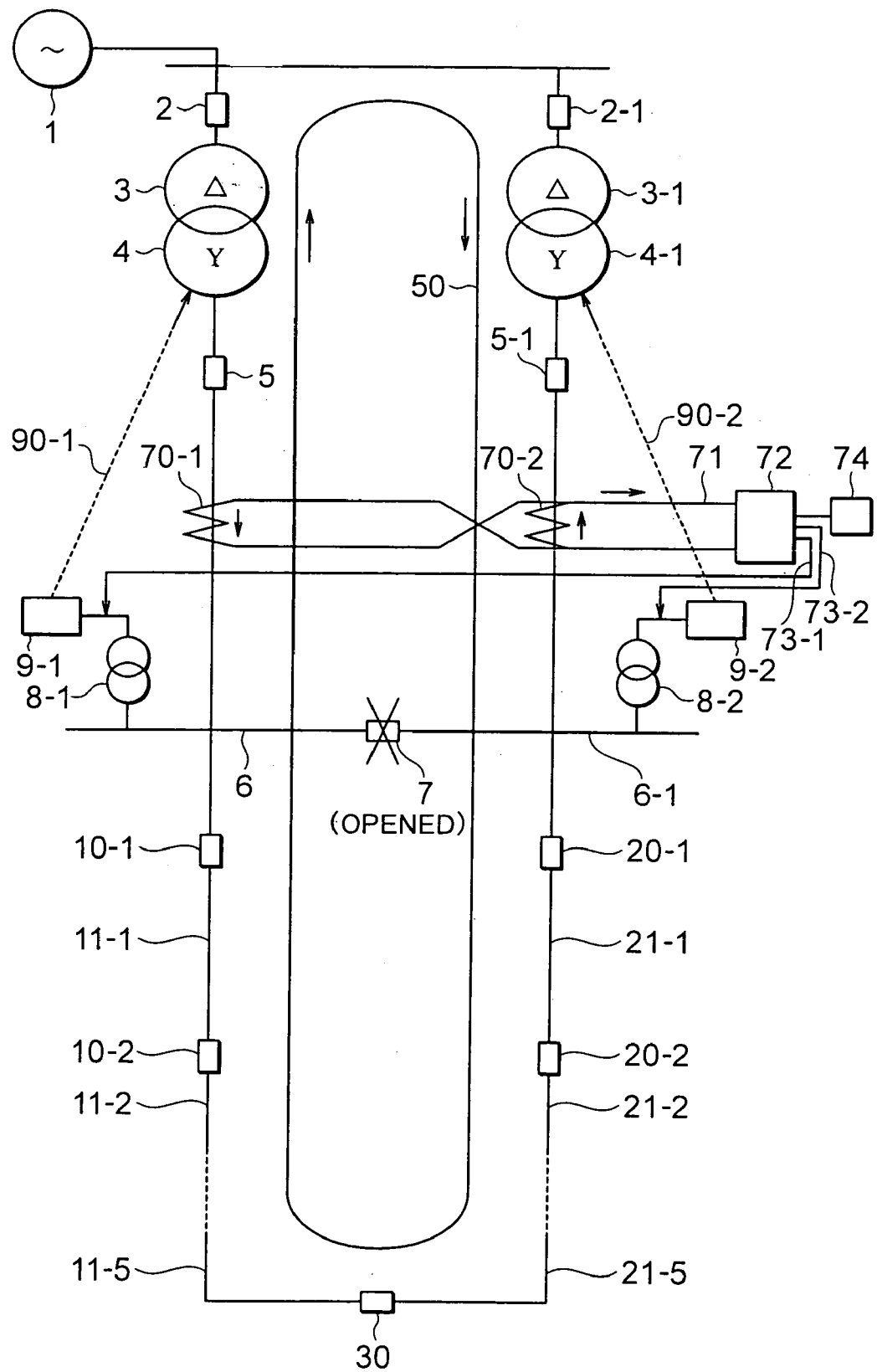
FIG. 12 is a circuit diagram showing the cross current compensation control system for a distribution system in accordance with the seventh embodiment of the present invention.

In this case, as shown in FIG. 12, the seventh embodiment synthesizes the above first, second or third embodiment with the fourth, fifth, sixth or seventh embodiment without any problem in actual operation.

In other words, in the cross current compensation control system for a distribution system in accordance with the seventh embodiment, the cross current detection compensator 72 includes the switch contact 100 that is connected between the input terminals of the cross current detection compensator and closed when the bus bar connection circuit breaker 7 that connects the bus bars 6 and 6-1 is opened, and the switch contacts 101 and 102 that are connected between the output terminals of the cross current detection compensator and closed when the bus bar connection circuit breaker 7 that connects the bus bars 6 and 6-1 is opened.

According to the seventh embodiment, because the function of the cross current detection compensator 72 is canceled at both of the input side and the output side of the cross current detection compensator 72, the cancellation of the function of the cross current detection compensator 72 can provide the sure system.

(Eighth Embodiment)

Figure 13:
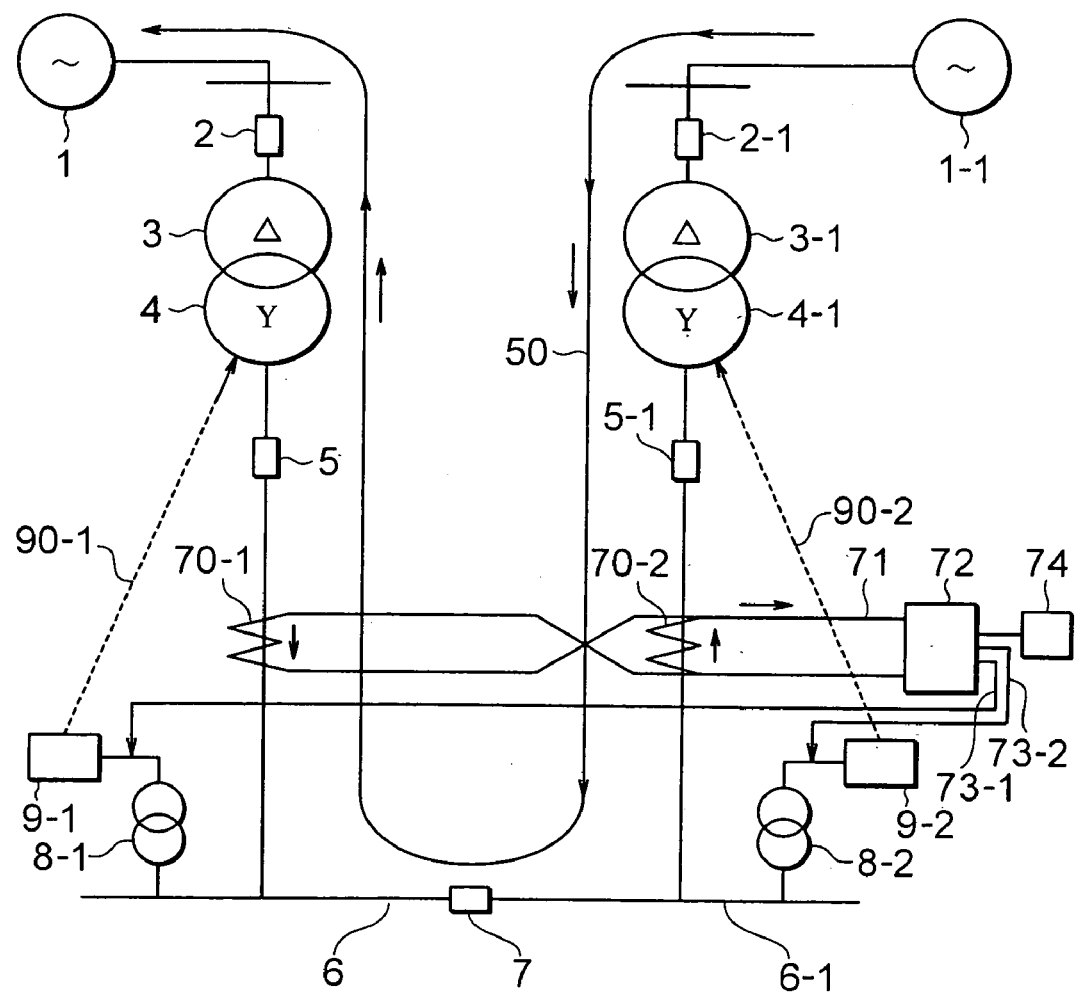
FIG. 13 is a circuit diagram showing a cross current compensation control system for a distribution system in accordance with an eighth embodiment of the present invention.
Figure 14:
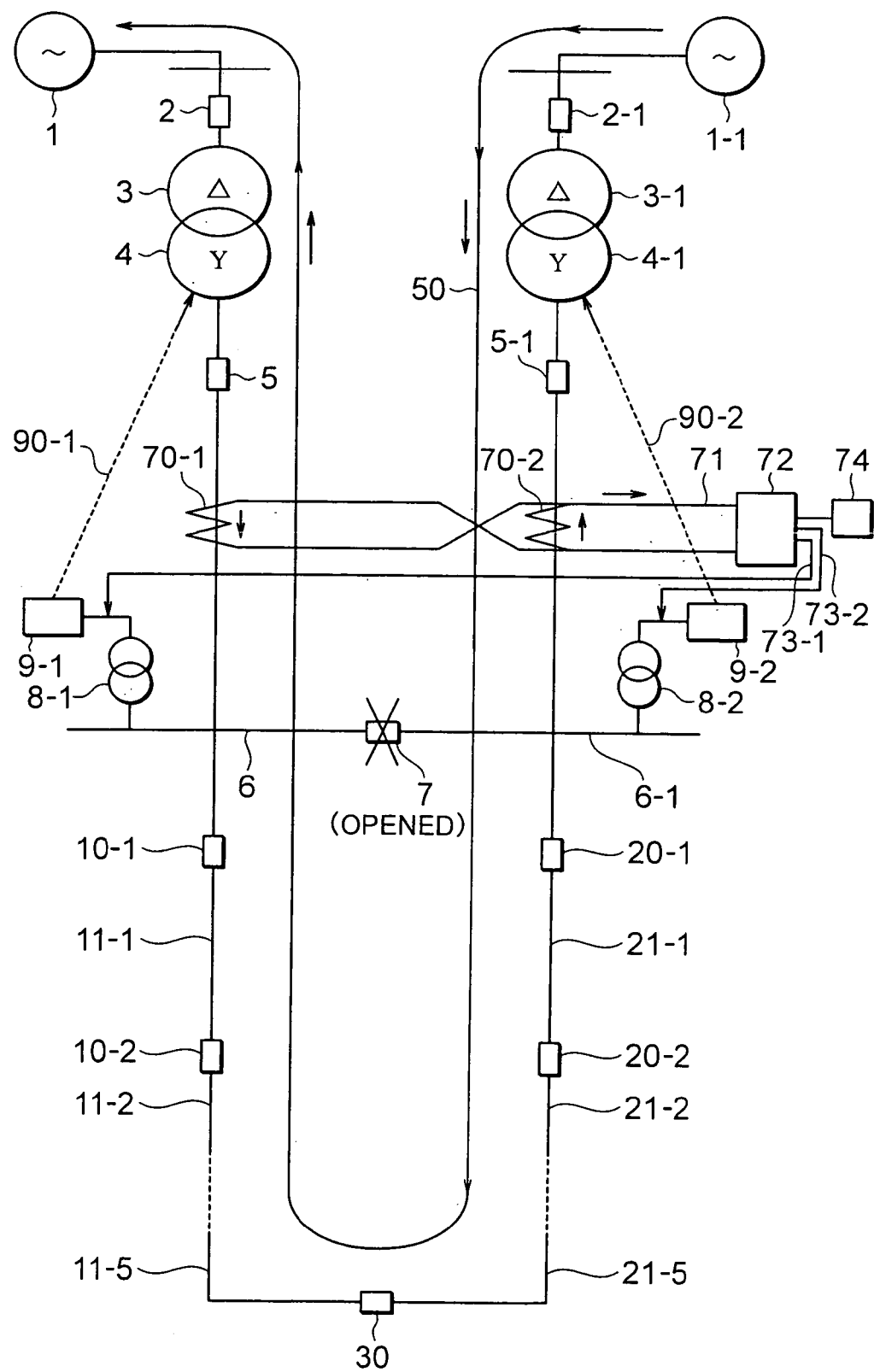
FIG. 14 is a circuit diagram showing the cross current compensation control system for a distribution system in accordance with the eighth embodiment of the present invention.

Across current compensation control system for a power system in accordance with an eighth embodiment of the present invention will be described with reference to the accompanying drawings. FIGS. 13 and 14 are diagrams showing in detail the cross current compensation control system for a distribution system in accordance with the eighth embodiment of the present invention.

Referring to FIG. 13, a power supply 1 and a power supply 1-1 represent different power supplies. In general, there are many cases in which the power supply 1 and the power supply 1-1 are of the same system and connected to each other through a bus bar of an immediately upstream distribution substation.

Similarly, in this example, it is apparent that a cross current similar to that in the above fourth embodiment occurs. The cross current 50 in this case adds the phase difference of the power supplies to the cross current in the fourth embodiment, and a much larger cross current may flow depending on the system operational state.

Referring to FIG. 13, in the case where the bus bar connection circuit breaker 7 is closed, "voltage adjustment" control of the respective power transformers (3, 4) and (3-1, 4-1) is first conducted in the normal operation. If the "voltage adjustment" is insufficient, it is apparent that the remarkable cross current flows. The eighth embodiment is applied to the backup of the "voltage adjustment". After the "voltage adjustment", the above-mentioned fourth to seventh embodiments are applied in order to surely minimize the cross current.

In addition, the cross current compensation in the case where the bus bar connection circuit breaker 7 is opened and the switch 30 is closed will be described.

That is, as shown in FIG. 14, in this case, similarly, the input voltages to the voltage adjustment relays 9-1 and 9-2 are made appropriate, thereby being capable of realizing the intended function.

In other words, the cross current compensation control system for a distribution system in accordance with the eighth embodiment includes: the current transformer 70-1 disposed at the secondary side of the power transformers (3, 4) connected to the power supply 1; the current transformer 70-2 disposed at the secondary side of the power transformers (3-1, 4-1) connected to the power supply 1-1; the cross current detection compensator 72 connected to the cross connection line 71 that cross-connects the secondary sides of the current transformers 70-1 and 70-2; the voltage adjustment relay 9-1 connected to the bus bar 6 connected to the secondary sides of the cross current detection compensator 72 and the power transformers (3, 4); and the voltage adjustment relay 9-2 connected to the bus bar 6-1 connected to the secondary sides of the cross current detection compensator 72 and the power transformers (3-1, 4-1), in which: the cross current detection compensator 72 outputs the compensation voltage when detecting the cross current that circulates within the host bus bar (not shown) that connects the power supplies 1 and 1-1, the power transformers (3, 4) and (3-1, 4-1), the bus bars 6 and 6-1 and the bus bar connection circuit breaker 7 that connects the bus bars 6 and 6-1; the voltage adjustment relay 9-1 controls the voltage adjustment tap at the secondary side of the power transformers (3, 4) on the basis of the voltage of the bus bar 6 and the compensation voltage; and the voltage adjustment relay 9-2 controls the voltage adjustment tap at the secondary side of the power transformers (3-1, 4-1) on the basis of the voltage of the bus bar 6-1 and the compensation voltage.

According to the eighth embodiment, because there can be provided the system that can minimize the cross current 50 in the power transformers (3, 4) and (3-1, 4-1) of the different systems which are driven in parallel and the distributions 10 and 20, it is possible to reduce the useless power loss of the power transformers (3, 4), (3-1, 4-1) and the distributions 10 and 20. Simultaneously, the protection relays, the measuring devices and so on located at the respective points of the distributions 10 and 20 can accurately exhibit the natural functions thereof.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cross current compensation control system for a power system, comprising:
first and second current transformers disposed at respective sending ends of first and second power systems commonly connected to a bus bar;
a plurality of third current transformers disposed in each of sections of the first and second power systems; and
a cross current detection compensator having an input terminal and an output terminal, a cross connection line that cross-connects a secondary side of the first and second current transformers to the input terminal, and a cross current compensation line, connecting secondary sides of the plurality of third current transformers in series, connected to the output terminal, wherein the cross current detection compensator supplies a compensation current to the cross current compensation line to cancel a current component corresponding to a cross current that appears at the secondary sides of the plurality of the third current transformers, when the cross current detection compensator detects a cross current that circulates in the bus bar, in a switch that connects the first and second power systems, and in the first and second power systems.

2. The cross current compensation control system for a power system according to claim 1, further comprising a contactor that is connected between the output terminals of the cross current detection compensator and closed when the switch that connects the first and second power systems is opened.

3. The cross current compensation control system for a power system according to claim 1, further comprising:
a first contactor that is connected between the output terminals of the cross current detection compensator and closed when the switch that connects the first and second power systems is opened; and
a second contactor that is connected between the input terminals of the cross current detection compensator and closed when the switch that connects the first and second power systems is opened.

4. A cross current compensation control system for a power system, comprising:
first and second current transformers disposed at respective secondary sides of first and second power transformers, the first and second power transformers being commonly connected to a power supply;
a cross current detection compensator connected to a cross connection line, the cross connection line connecting the secondary sides of the first and second current transformers to each other;
a first voltage adjusting device connected to a first bus bar, the first voltage adjusting device being connected to the cross current detection compensator and to the secondary side of the first power transformer; and
a second voltage adjusting device connected to a second bus bar, the second voltage adjusting device being connected to the cross current detection compensator and to the secondary side of the second power transformer, wherein,
the cross current detection compensator outputs a compensation voltage when detecting a cross current that circulates within the first and second power transformers, the first and second bus bars, and a switch that connects the first bus bar to the second bus bar;
the first voltage adjusting device controls a voltage adjustment tap at the secondary side of the first power transformer based on voltage of the first bus bar and the compensation voltage; and
the second voltage adjusting device controls a voltage adjustment tap at the secondary side of the second power transformer based on voltage of the second bus bar and the compensation voltage.

5. The cross current compensation control system for a power system according to claim 4, wherein the cross current detection compensator comprises a contactor that is connected between the input terminals of the cross current detection compensator and closed when the switch that connects the first and second bus bars is opened.

6. The cross current compensation control system for a power system according to claim 4, wherein the cross current detection compensator comprises a contactor that is connected between the output terminals of the cross current detection compensator and closed when the switch that connects the first and second bus bars is opened.

7. The cross current compensation control system for a power system according to claim 4, wherein the cross current detection compensator comprises:
a first contactor that is connected between the input terminals of the cross current detection compensator and closed when the switch that connects the first and second bus bars is opened; and
a second contactor that is connected between the output terminals of the cross current detection compensator and closed when the switch that connects the first and second bus bars is opened.

8. A cross current compensation control system for a power system, comprising:
a first current transformer disposed at a secondary side of a first power transformer connected to a first power supply;
a second current transformer disposed at a secondary side of a second power transformer connected to a second power supply;
a cross current detection compensator connected to a cross connection line, the cross connection line connecting secondary sides of the first and second current transformers;
a first voltage adjusting device connected to a first bus bar, the first voltage adjusting device being connected to the cross current detection compensator and to the secondary side of the first power transformer; and
a second voltage adjusting device connected to a second bus bar, the second voltage adjusting device being connected to the cross current detection compensator and to the secondary side of the second power transformer, wherein,
the cross current detection compensator outputs a compensation voltage when detecting a cross current that circulates within the first and second power transformers, the first and second bus bars, and a switch that connects the first bus bar to the second bus bar;
the first voltage adjusting device controls a voltage adjustment tap at the secondary side of the first power transformer based on voltage of the first bus bar and the compensation voltage; and
the second voltage adjusting device controls a voltage adjustment tap at the secondary side of the second power transformer based on voltage of the second bus bar and the compensation voltage.

* * * * *